(12) United States Patent
Möllmann

(10) Patent No.: US 6,702,257 B1
(45) Date of Patent: Mar. 9, 2004

(54) DEVICE FOR CONTROLLING FLOWING MEDIA

(76) Inventor: Dieter Möllmann, Ahlhorner Strasse 34, Wildeshausen (DE), 27793

( * ) Notice: Subject to any disclaimer, the term of this patent is extended or adjusted under 35 U.S.C. 154(b) by 0 days.

(21) Appl. No.: 09/959,370

(22) PCT Filed: Apr. 20, 2000

(86) PCT No.: PCT/EP00/03645
§ 371 (c)(1),
(2), (4) Date: Jan. 24, 2002

(87) PCT Pub. No.: WO00/65261
PCT Pub. Date: Nov. 2, 2000

(30) Foreign Application Priority Data
Apr. 21, 1999 (DE) .......................... 199 18 128

(51) Int. Cl.7 ............................... F16K 1/22
(52) U.S. Cl. ...................... 251/306; 251/305
(58) Field of Search ................ 251/305, 306, 251/304

(56) References Cited

U.S. PATENT DOCUMENTS

| | | | |
|---|---|---|---|
| 3,945,398 A | | 3/1976 | Masheder |
| 3,963,213 A | * | 6/1976 | Brattberg ............... 251/306 |
| 4,480,815 A | * | 11/1984 | Kreij ..................... 251/306 |
| 4,601,459 A | * | 7/1986 | Verdelet ................. 251/305 |
| 4,770,393 A | * | 9/1988 | Hubertson ............... 251/305 |

FOREIGN PATENT DOCUMENTS

| | | |
|---|---|---|
| EP | 0029110 A | 5/1981 |
| EP | 0780608 A | 6/1997 |
| GB | 1536837 A | 12/1978 |

* cited by examiner

Primary Examiner—Henry C. Yuen
Assistant Examiner—John Bastianelli
(74) Attorney, Agent, or Firm—Technoprop Colton LLC

(57) ABSTRACT

The invention relates to a shut-off flap for pipelines, with a flap disc which is pivotable relative to an axis of rotation in a housing and which, in the sealing position, closes the throughflow through the housing in the region of a seal. The particular feature of the shut-off valve according to the invention is that the flap disc (32) is self-closing in both flow directions.

15 Claims, 23 Drawing Sheets

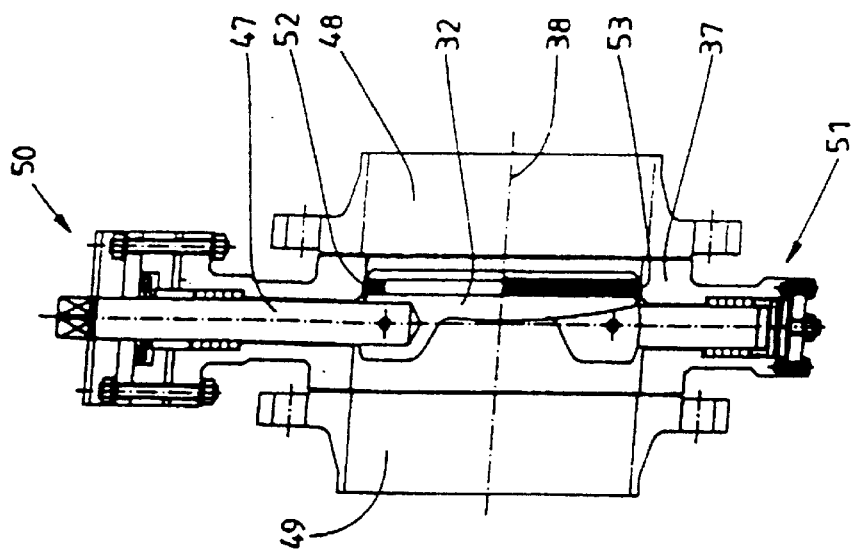
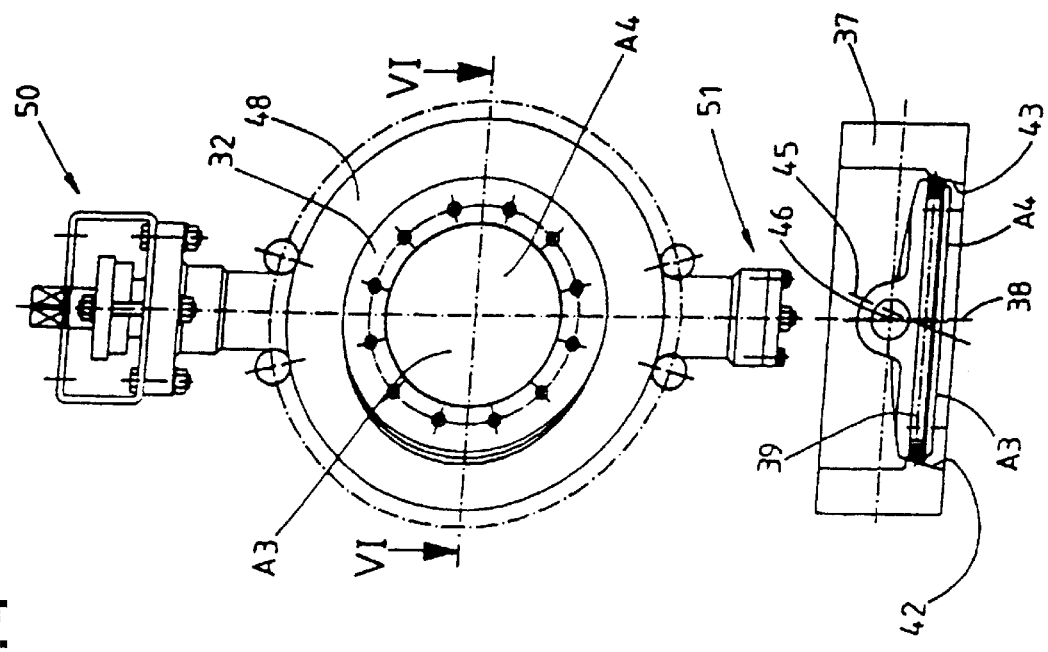

DEVICE FOR CONTROLLING FLOWING MEDIA

BACKGROUND OF THE INVENTION

The invention relates to a shut-off flap for pressure spaces, in particular for vessels or pipelines, with a flap disc which is pivotable relative to an axis of rotation in a housing and which, in the sealing position, closes the throughflow through the housing in two mutually opposite flow directions in the region of a seal, the flap disc being arranged eccentrically, that is to say with an axis of rotation outside a seal center line, and the axis of rotation passing, in particular, through a major axis of the shut-off flap.

In pipelines carrying flowing media, the flow is interrupted by means of valves, slides or flaps. Flaps are preferred because of the markedly smaller overall length.

The simplest embodiment of a flap has an axis of rotation running centrally along the flap disc. An eccentric form of construction, in which the axis of rotation runs at a distance from the flap disc, is also known. This, as a rule, improves the sealing function of the flap disc, because the seal of the disc is not interrupted by the rotary shaft led out of the interior of the housing. Instead, said rotary shaft is seated in front of or behind the flap disc. Moreover, the axis of rotation or the rotary shaft is arranged centrally in front of the flap disc and intersects a major axis of the shut-off flap and therefore, as a rule, also the major axis of the pipeline.

Finally, what are known as double-eccentric flaps are known. In this type, in addition to the eccentricity described, the axis of rotation or the rotary shaft is arranged outside the major axis, that is to say at a short distance from the latter. This makes it possible to have a self-closing effect or positive closing for one flow direction. With regard to the other flow direction, there is the disadvantage of a permanent opening pressure, so that a likewise permanent and high closing force, with a correspondingly high drive torque, has to be applied. In the long term, particularly under relatively high line pressures, leakage points occur which make it impossible to work safely on the shut-off side of the pipeline.

BRIEF SUMMARY OF THE INVENTION

Against this background, the object of the present invention is to provide a shut-off flap with an improved sealing action. Another object is to manage with lower drive torques.

In a development of the invention it is provided that the flap disc is self-closing in both flow directions. That is to say, the last portion of the closing movement is assisted by the resulting working pressure acting on the flap disc, irrespective of the flow direction. In the simplest instance, this is made possible by a centrally mounted flap disc which, in the closing position, has surfaces of different sizes laterally next to the axis of rotation in both flow directions, both the larger surfaces and the smaller surfaces in each case being located opposite one another diagonally with respect to the axis of rotation. This apparently impossible arrangement is made possible by a specific thickness of the flap disc and by a peripheral sealing surface which is sloped in lateral regions at the greatest distance from the axis of rotation. The seal then has laterally a three-dimensional depth in the direction of the major axis and in the direction of the diameter. It is precisely the depth in the direction of the diameter which makes it possible to provide different surface conditions for the two flow directions. That side of the flap disc which faces one flow is subdivided by the axis of rotation into a left and a right surface. The difference between the surfaces is relevant for generating the closing force. In a view of the flap disc according to the flow direction and with the flap disc closing clockwise, a positive closing effect is obtained when the left surface is larger than the right surface. The same condition is to be adhered to on the other side of the flap disc for the other flow direction. This is possible by means of the laterally obliquely directed sealing surface, so that what is referred to as the left flap surface on one side is larger than the right flap surface (opposite to it) on the other side.

Preferably, ring-like sealing elements are arranged, in particular, on the circumference of the flap disc and are pressed onto the peripheral sealing surface during the closing of the flap disc. In this case, a circumferential stress is built up, so that the pressure is distributed uniformly on the circumference and there is a high sealing action all-round.

The above-described slope of the sealing surface may be formed to a differing extent at the edges located laterally opposite one another or peripherally as a whole, so that what is referred to as a seat cone or taper is obtained. The flap disc may also be designed eccentrically, that is to say with an axis of rotation outside the flap disc or outside an associated seal center line. In this embodiment, too, in principle, positive closing in both flow directions is possible.

Advantageously, the axis of rotation is arranged on the major axis or intersects the latter. It thereby becomes simpler to design the shut-off flap. The forces and torques which occur are virtually symmetrical.

When the seat cone is used or arranged, a large seat-cone angle is advantageous for reducing the frictional forces during closing. The seat cone is defined by the position of the seat-cone axis or taper axis and by the position of the taper apex. The seat cone must be selected or calculated in such a way that it is impossible for the flap disc to be jammed in the sealing region. A particularly advantageous embodiment of the invention relates to a shut-off flap with a seat cone, the latter having a geometric shape determined according to specific criteria.

The position, peripheral sealing surface may, in other words, be reproduced as follows:

a. the peripheral sealing surface is part of a taper envelope, the generatrices of which define the angles of the sealing surface in relation to the major axis of the shut-off flap, b. the generatrices intersect one another in the region of a taper apex, the position of which can be defined as follows:

b1. the seal center line intersects the major axis perpendicularly to the latter, b2. the axis of rotation of the flap disc is arranged at a distance (eccentrically) from the seal center line, in particular on the major axis, and runs transversely to the seal center line and to the major axis, b3. with the axis of rotation as the center point, a sealing circle is defined, the diameter of which is smaller than the nominal width of the pipeline or of the available inside diameter within the shut-off flap, b4. intersection points of the sealing circle with the seal center line are designated as A and C, and the intersection point of the sealing circle with a straight line through A and with the center point is designated as B, B being located opposite the point A across the center point, b5. a flap radius of half the distance from A to C is obtained, b6. a line parallel to the major axis is at a distance from the latter corresponding to three times the flap radius, both the parallel line and the points B and C being located opposite the point A across the major axis, b7. a tangent to the sealing circle through the point B intersects the line parallel to the major axis at a point which defines the taper apex.

It is expediently assumed, at the same time, that the taper apex and the center of rotation are located on different sides of the seal center line. The closing direction of the flap disc is also such that the latter, in its open position, is located opposite the taper apex across the major axis.

As stated in the first paragraphs of the description, eccentric or double-eccentric forms of construction are known. A shut-off flap having the features according to the invention makes it possible to design an eccentric form of construction in which the axis of rotation intersects, in particular, the major axis and actuation of the flap disc in both directions of rotation and in both flow directions is possible with substantially lower drive torques than in all the shut-off valves known hitherto. This also applies to designs in which a seal extending peripherally on the flap disc, for example a peripherally extending spring ring, is virtually as thin as desired in the flow direction. A flap disc of this type, admittedly, is no longer self-closing. Instead, a slight holding torque for maintaining the closed position of the flap disc may be necessary. However, the drive torque for opening the flap disc is likewise markedly lower than in the known shut-off flaps. The drive of the flap disc can have substantially smaller dimensions than hitherto. This is a great advantage precisely for quick-closing and opening flaps.

The use of a floating spring ring as a peripheral seal on the flap disc is another reason for the easy opening of the shut-off flap. This spring ring comes to rest, on the inside, on the conical seat of the peripheral sealing surface in the flap housing. The more the spring ring is pressed into the conical seat of the taper envelope, for example due to a pressure difference on the two sides of the flap disc or due to a drive torque, the higher a counterforce (force compensation) caused by the upsetting of the spring ring or a countertorque which is responsible for the easy opening of the flap disc becomes. The angles of the taper envelope are selected in such a way that there is freedom from jamming or there is no self-locking.

Finally, the invention also relates to different methods for the production of shut-off flaps. These relate, more specifically, to the machining of the sealing surfaces on the flap disc and on the housing. In practice, the seal consists of a peripheral sealing surface on the flap disc or on the housing and of corresponding sealing elements on the other part in each case. For example, a packing consisting of sealing rings or of lamellar seals may be provided. The sealing elements are machined in a similar way to the sealing surface. The flap disc is preferably provided with the sealing elements.

Further features of the invention, moreover, may be gathered from the claims and from the description.

BRIEF DESCRIPTION OF THE DRAWINGS

Exemplary embodiments of the invention are described in more detail below with reference to the drawings in which:

FIG. 4 to 6 show a shut-off flap from three different views, to be precise from a top view in one flow direction, in a vertical section and in a horizontal section, the latter being similar to FIG. 1 to 3.

DETAILED DESCRIPTION OF THE PREFERRED EMBODIMENTS

Figure 1:
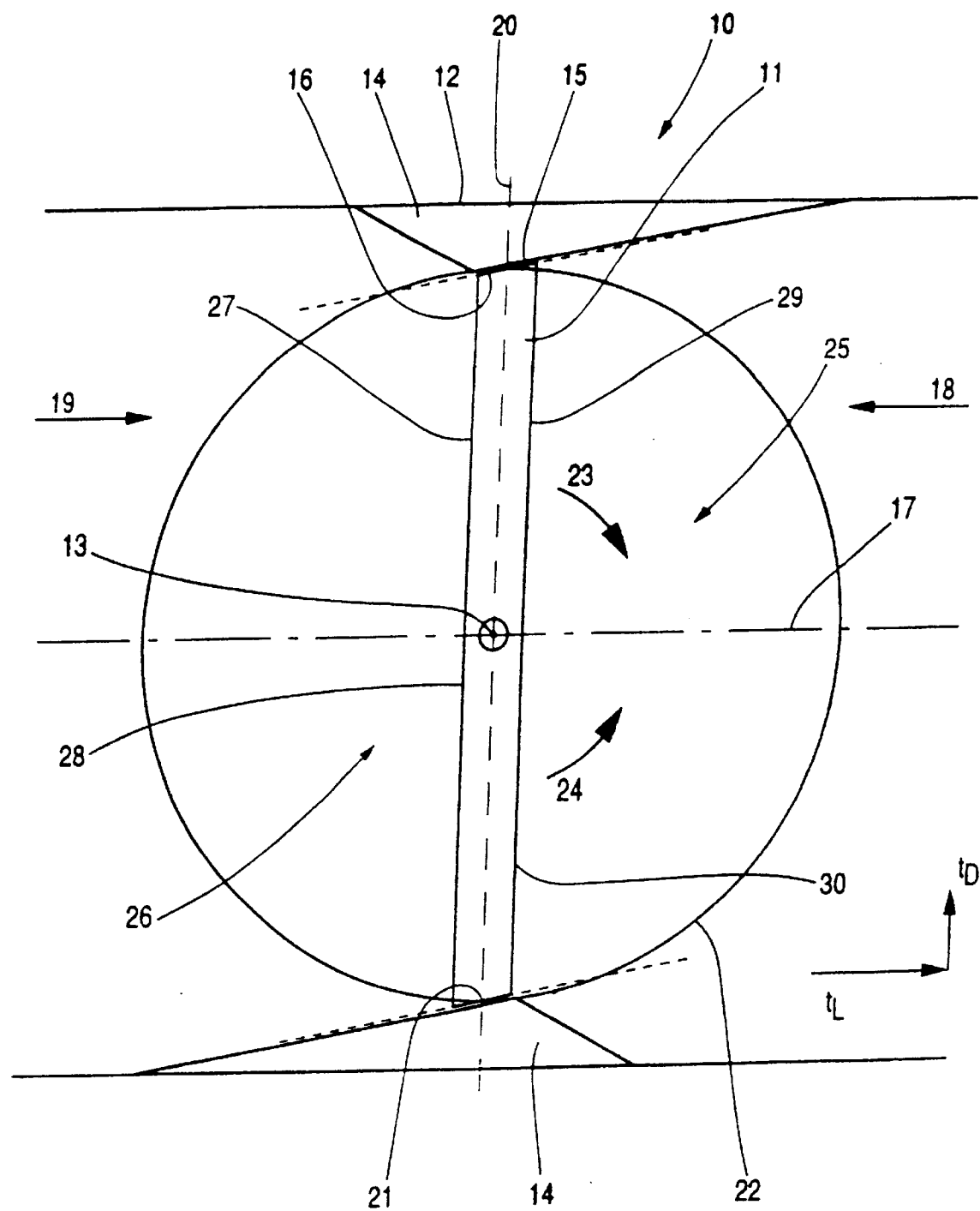
FIG. 1 shows a section through a centric shut-off flap.

Some important basic concepts of a shut-off flap 10 according to the invention will first be explained with reference to FIG. 1. A flap disc 11 is arranged in a housing 12 with a centric axis of rotation 13. Upstream and downstream pipelines are not shown.

A sealing seat in the housing 12 is designated by the numeral 14 and has a peripheral sealing surface 15. A corresponding sealing surface in the region of the flap disc 11 bears the reference numeral 16. In practice, a plurality of sealing lamellae may also be provided here or in the housing.

A major axis 17 of the shut-off flap 10 extends parallel to the flow directions 18, 19 and, in the present case, passes through the axis of rotation 13. More specifically, the major axis 17 occurs as an axis along the flow directions and through a surface center of gravity of the flap 11. The major axis is also normally at the same time the pipe axis.

The sealing surfaces 15, 16 are angled in relation to the major axis 17, so that dimensions in the direction of the major axis 17 are obtained (depth TL in the direction of the major axis and depth TD in the direction of the diameter). The slope of the sealing surfaces 15, 16 is greatest where the distance from the axis of rotation 13 is also greatest. At the passage of the axis of rotation 13 through the sealing surfaces 15, 16, the latter are oriented parallel to the major axis 17 and therefore have no slope. By virtue of the depth of the sealing surfaces 15, 16 in the direction of the major axis 17, a seal center line 20 can be indicated. The intersection point 21 of the latter with the sealing surface 16 describes a sealing circle 22 during the pivoting of the flap disc 17.

In the present case, the flap disc 11 is to be rotated clockwise in the direction of the arrow 23 for opening and anti-clockwise in the direction of the arrow 24 for closing.

The shut-off flap 10 is designed in such a way that the flap disc 11 closes positively in both flow directions 18, 19. In the event of a flow in the direction of the arrow 18, a right disc side 25 is acted upon and, in the case of a flow in the opposite direction 19, a left disc side 26 is acted upon. The two sides 25, 26 may be subdivided into side surfaces 27, 28 and 29, 30 located opposite one another, the separation resulting from the position of the major axis 17. On the assumption of the flow direction 18, a closing force is obtained due to the surfaces 29 and 30 being of different sizes. The side surface 29 is larger than the side surface 30 because of the obliquely directed sealing surface 16. The conditions are exactly the reverse on the opposite side 26. Correspondingly, in the case of the reverse flow direction 19, hereto, a closing force occurs due to the surfaces 27 and 28 being of different sizes.

Figure 2:
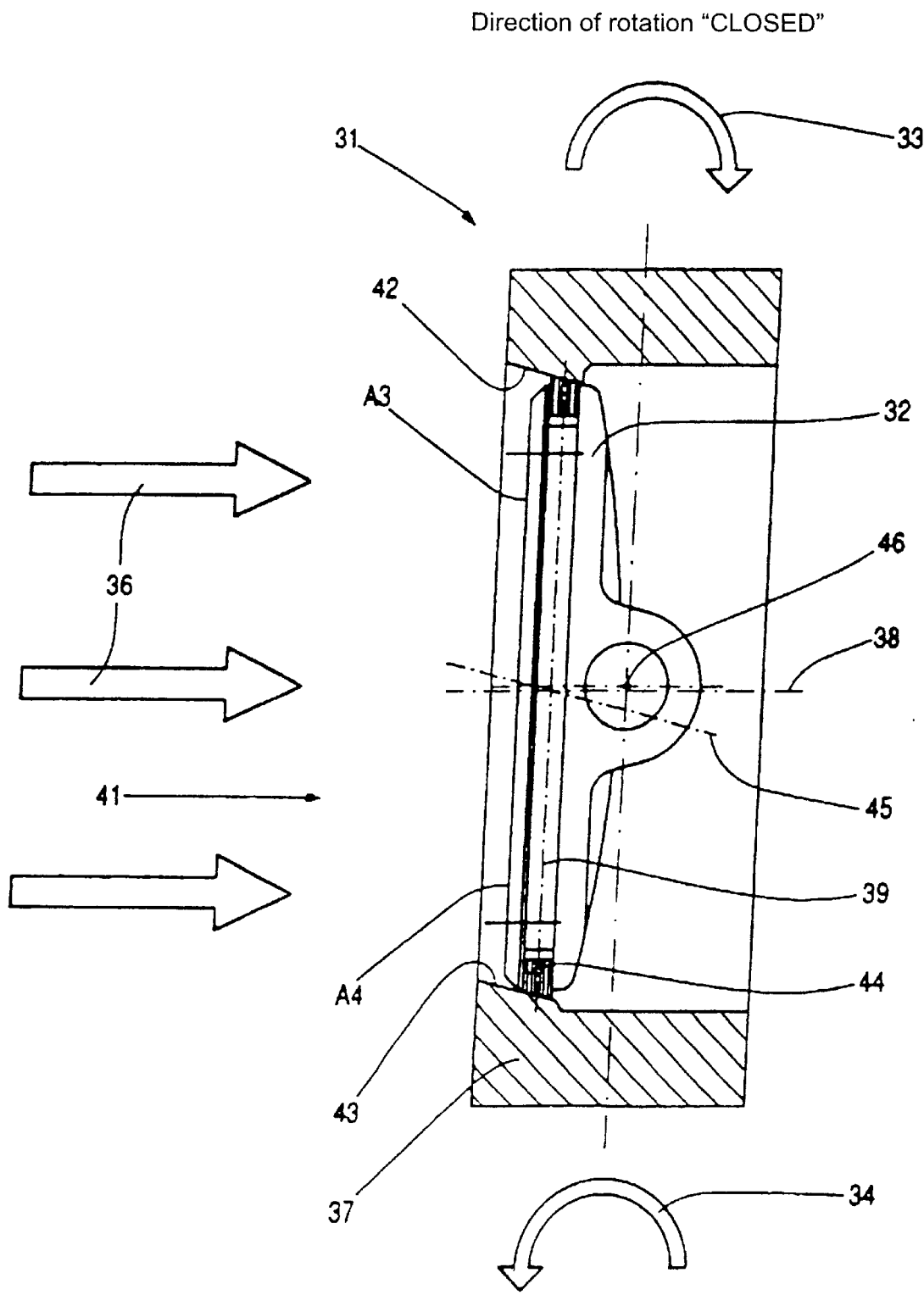
FIG. 2 shows a section through an eccentric shut-off flap, with a specific flow direction being indicated.
Figure 3:
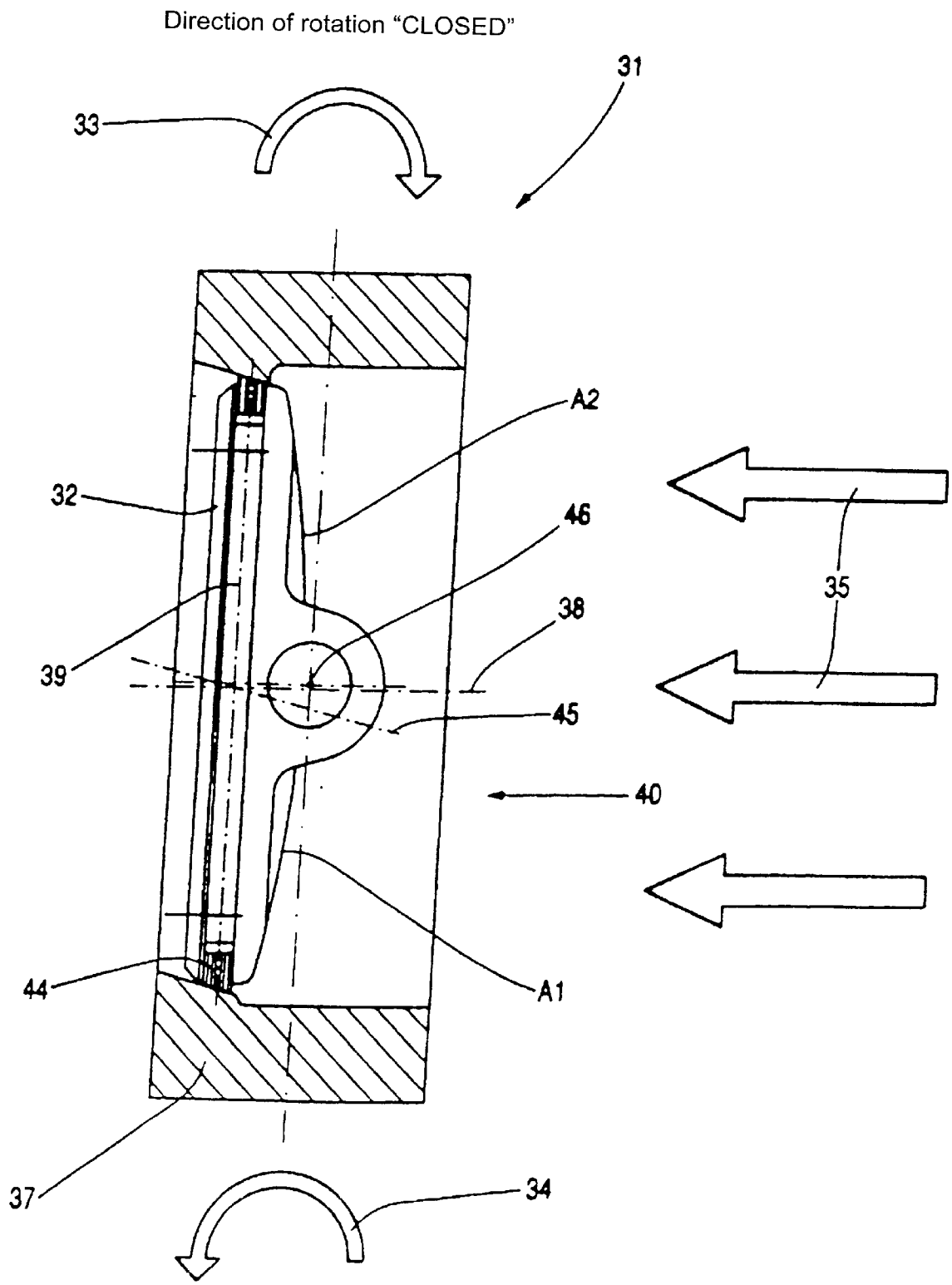
FIG. 3 shows the shut-off flap according to FIG. 2 with an opposite flow direction.

The relationships described can also be seen in FIGS. 2 and 3 with reference to a somewhat differently configured shut-off flap 31. The directions of rotation are interchanged here, as compared with FIG. 1. Thus, the flap disc 32 closes during clockwise rotation, arrow 33, and opens as a result of anti-clockwise rotation, arrow 34. The different flow directions are indicated by the arrows 35 and 36, the housing by numeral 37, the major axis by numeral 38 and a seal center line by the numeral 39. Side surfaces of different sizes bear the designations A1, A2 on the right side 40 and A3, A4 on the left side 41. As in the exemplary embodiment of FIG. 1, hereto, closing forces for both flow directions are obtained.

In contrast to FIG. 1, in FIGS. 2 and 3 the flap disc 11 has what is known as a cone seat with sealing surfaces 42, 43 on the housing 37 which are oriented conically in relation to one another and with correspondingly arranged sealing lamellae 44 on the circumference of the flap disc 32. Imaginary continuations of the sealing surfaces 42, 43 in the drawing plane meet in a way not shown on the left of the flap disc 32 and above the major axis 38 and thus form a taper. A peripheral sealing surface DF as part of a taper envelope is obtained in the circumferential direction. An obliquely directed line 45 passing through the seal center line 39 and the major axis 38 constitutes the taper axis.

In contrast to the shut-off flap 10, the shut-off flap 31 is designed to be slightly (double-) eccentric, with a center of rotation 46 just next to the major axis 38. The selected eccentricity, to be precise the distance of the center of rotation 46 from the major axis 38, is small, but nevertheless such that closing forces occur in both flow directions on account of the surface distributions. In the present case, the distance is smaller than half the depth TD of the sealing surface of the sealing lamellae 44. In this case, TD is obtained in the direction of the seal center line 39 transversely to the major axis 38, see also FIG. 1.

FIGS. 4 to 6 show three views of a shut-off flap illustration which is close to reality. This is, again, an eccentric flap with the same construction as in FIGS. 2 and 3. The same reference numerals are therefore provided. A rotary shaft 47, pipe flanges 48, 49 and bearings 50, 51 for the rotary shaft 47 can be seen in addition. It is clearly evident from FIG. 5 that, with the rotary shaft 47 vertical, the sealing surfaces have only a slight inclination in relation to the major axis 38 in an upper circumferential region 52 and a lower circumferential region 53. There is, of course, a smooth transition between these circumferential regions and the lateral circumferential regions with the sealing surfaces 42, 43. In actual fact, the regions 52, 53 are also at an angle to one another correspondingly to the "cone seat" described with reference to FIGS. 2 and 3.

Figure 7:
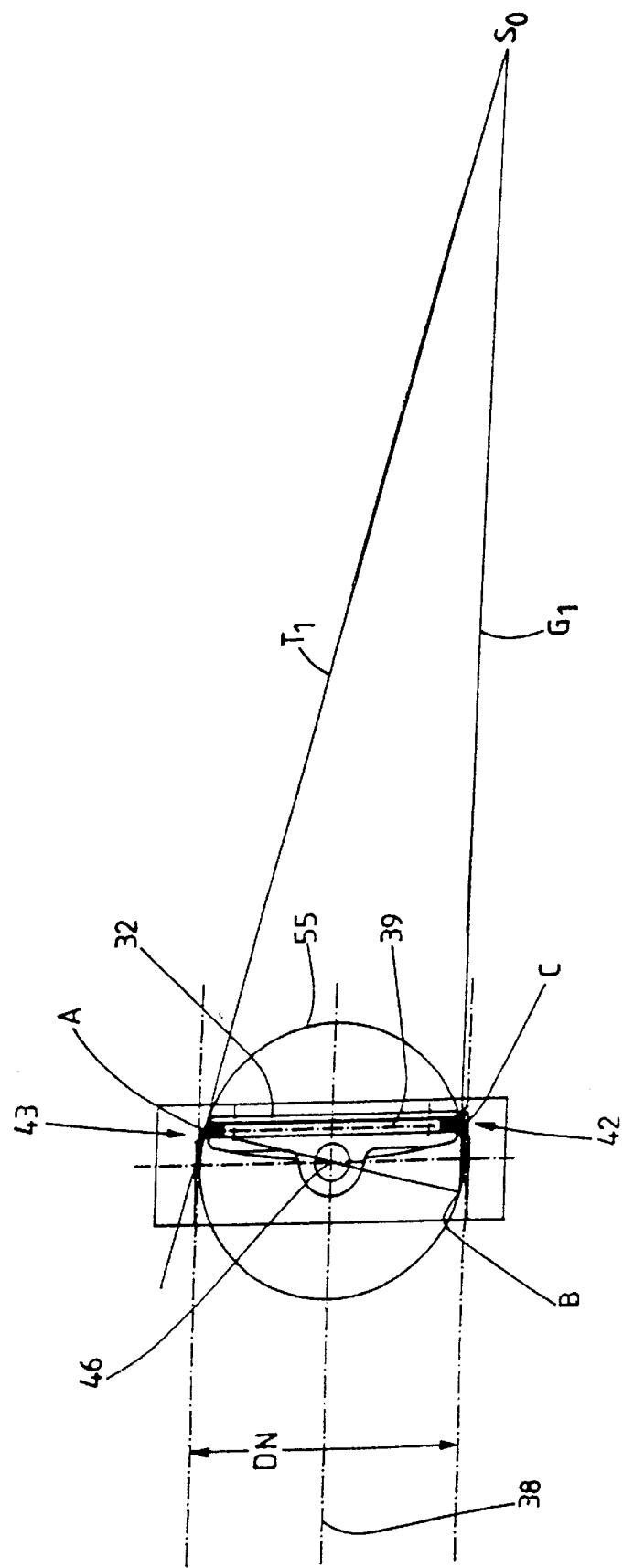
FIG. 7 shows a shut-off flap in horizontal section, with subsidiary lines for determining a seat cone or the seal geometry.
Figure 8:
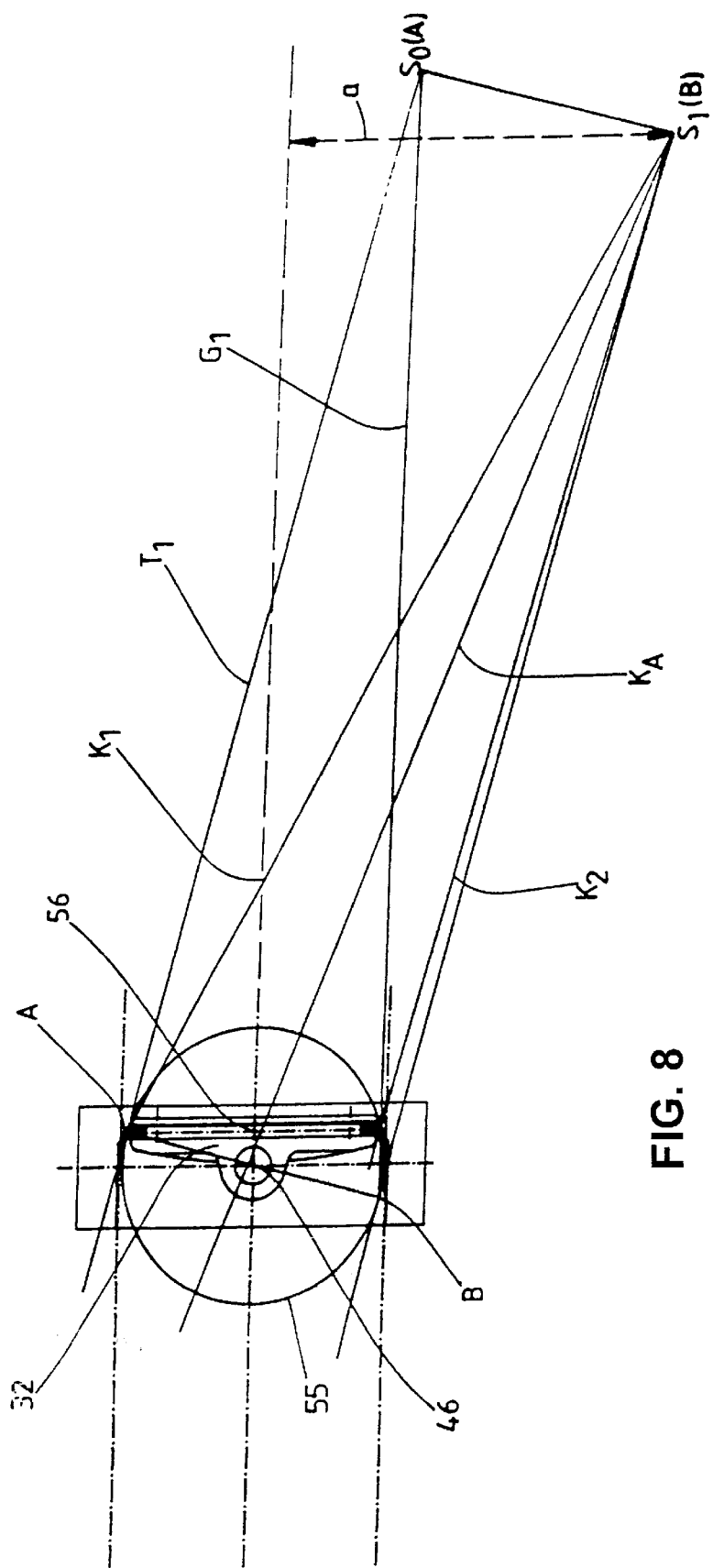
FIG. 8 shows an illustration corresponding to that of FIG. 7 with further subsidiary lines.
Figure 9:
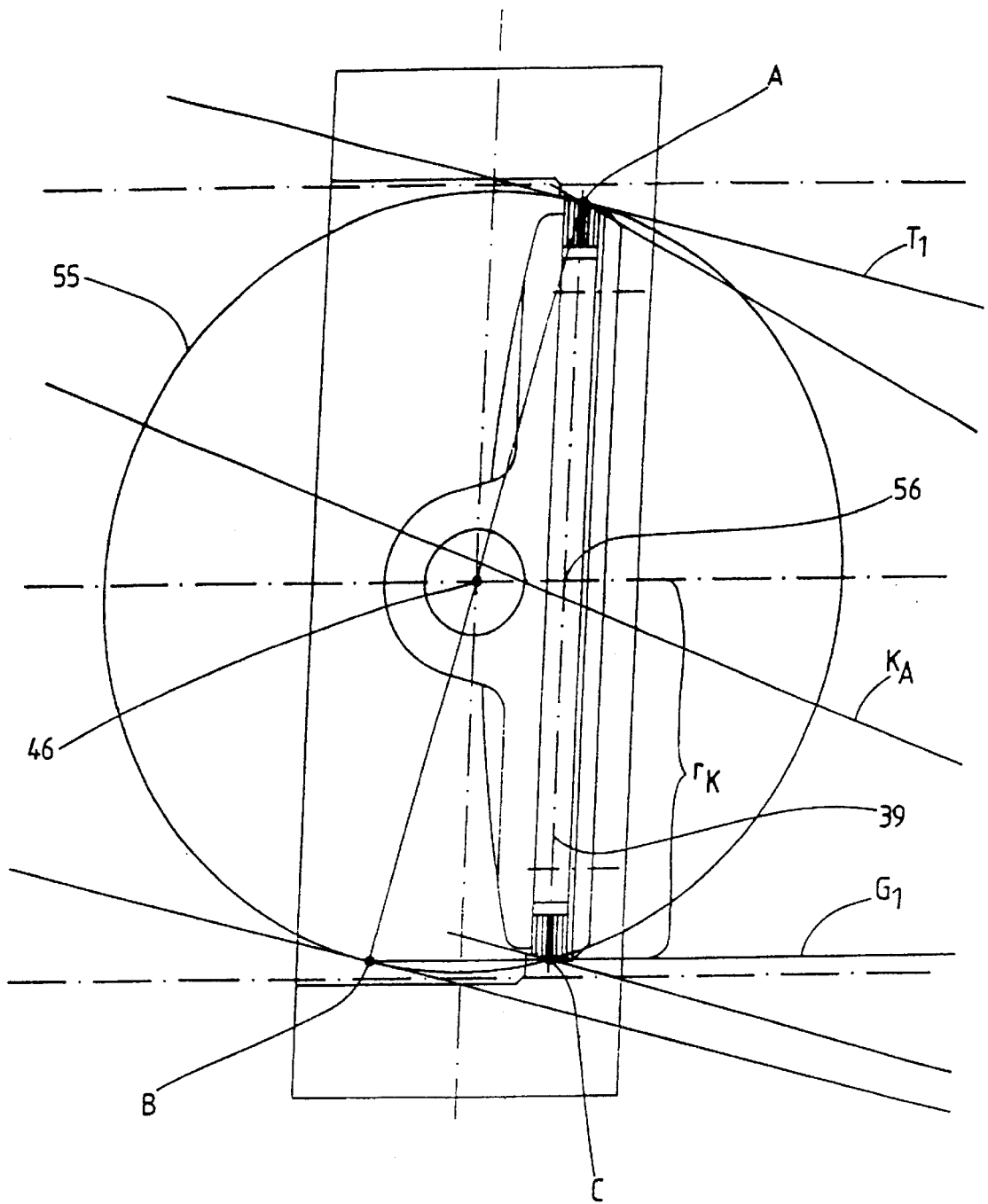
FIG. 9 shows an enlargement of a detail from FIG. 8.

The design of the "cone seat" and therefore the angularity of the sealing surfaces 42, 43 or of the circumferential regions 52, 53 are explained in more detail below with reference to FIGS. 7 to 9. The design of a shut-off flap according to FIGS. 4 to 6 is assumed here. The same reference numerals are used accordingly.

A pipeline to be closed has a nominal diameter DN. The flap disc 32 is, of course, somewhat smaller in diameter. In the present case, contrary to FIGS. 4 to 6, the latter is arranged centrally (only single eccentricity due to the arrangement of the axis of rotation outside the seal center line), with the center of rotation 46 through the major axis 38. The latter is also at the same time the pipe axis here. The sealing circle 55 is obtained about the center of rotation 56 in conjunction with an intersection point A of the seal center line 39 and of the sealing surfaces 42, 43 to be constructed. At this stage, the diameter in the region of the sealing surfaces 42, 43 is known or may be assumed as a precondition. Only the conical orientation of the sealing surfaces has to be constructed.

A straight line through the center of rotation 46 and the intersection point A leads automatically to an opposite intersection point B. An intersection point C is obtained, opposite the intersection point A, along the seal center line 39 and on the sealing circle 55.

By means of the points A, B and C, subsidiary lines are constructed, to be precise a tangent T1 to the sealing circle 55 through the point A and a straight line G1 through the points B and C. The straight lines T1 and G1 intersect one another at the point S0.

By the segment A–B being displaced along the tangent T1, the point A comes to lie on the point S0, whilst the point B defines a new point S1. Starting from this point S1, taper lines K1 and K2 are drawn through the points A and C. The taper lines K1, K2 describe the circumference of a taper (generatrices), which at the same time defines the cone seat in the shut-off flap 31 or the angles of the sealing surfaces 42, 43 and of the associated sealing elements on the flap disc 32.

As a result, the point S1 is at a distance a from the major axis 17, 38 which corresponds to three times the radius rK of the flap disc 32.

A taper axis KA runs from the intersection point S1 through the flap disc 32, specifically between the center of rotation 46 and an intersection point 56 of the major axis 38 and seal center line 39. The above-described position of the taper axis KA is a secondary condition for the closing action in both flow directions.

In the figures, in each case, the housing 37 has the peripheral sealing surface and the flap disc 32 has sealing lamellae 44. In actual fact, these elements may also be interchanged, so that, for example, the flap disc 32 has smooth sealing surfaces.

The production and machining of the sealing surfaces or lamellar assemblies are explained below with reference to FIGS. 10 to 15. In this case, the flap discs 32 are each arranged single-eccentrically, with the center of rotation 46 on the major axis 38.

Figure 10:
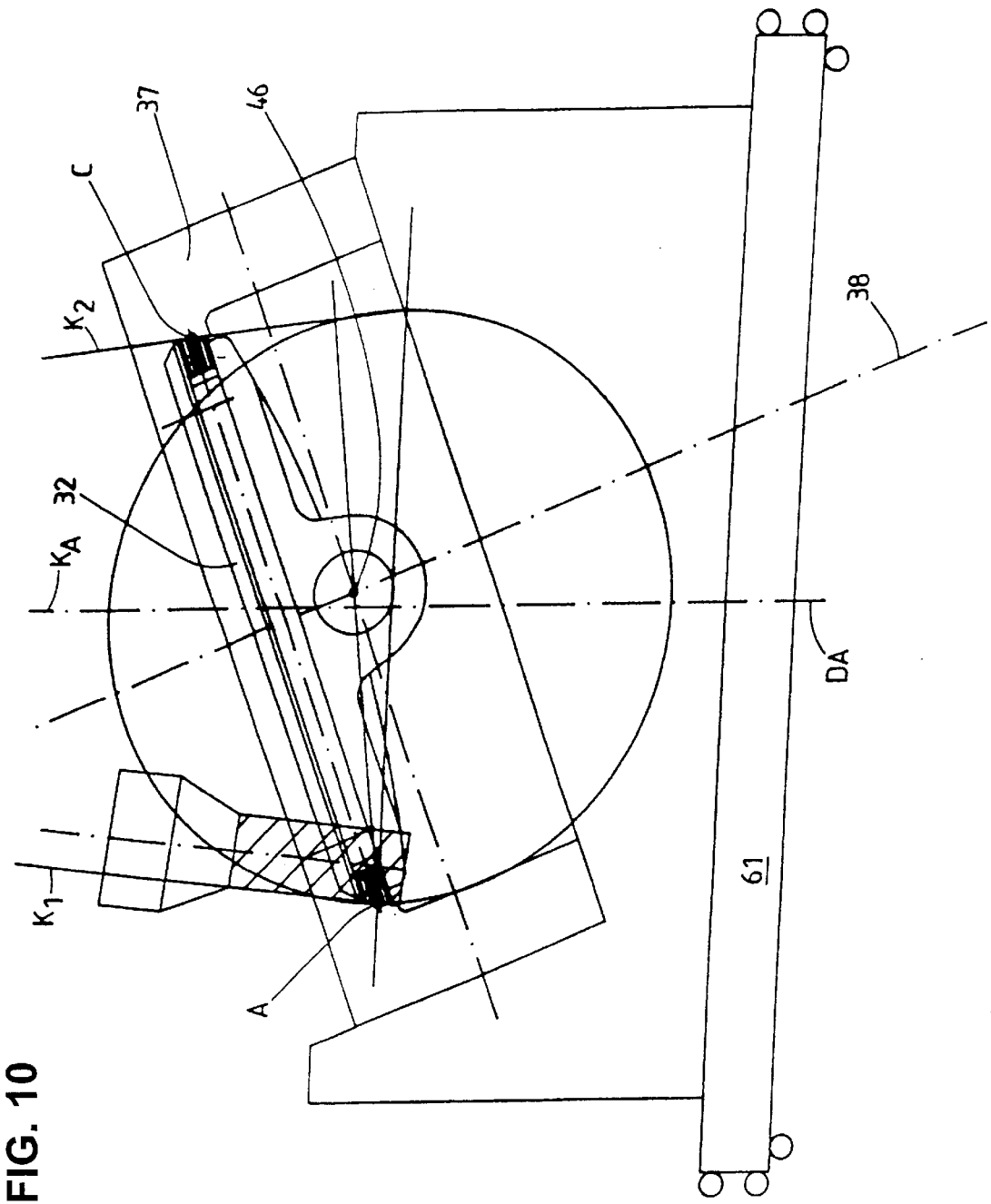
FIG. 10 shows a functional assembly, to be precise a shut-off flap in horizontal section, with a turntable of a CNC machine.
Figure 11:
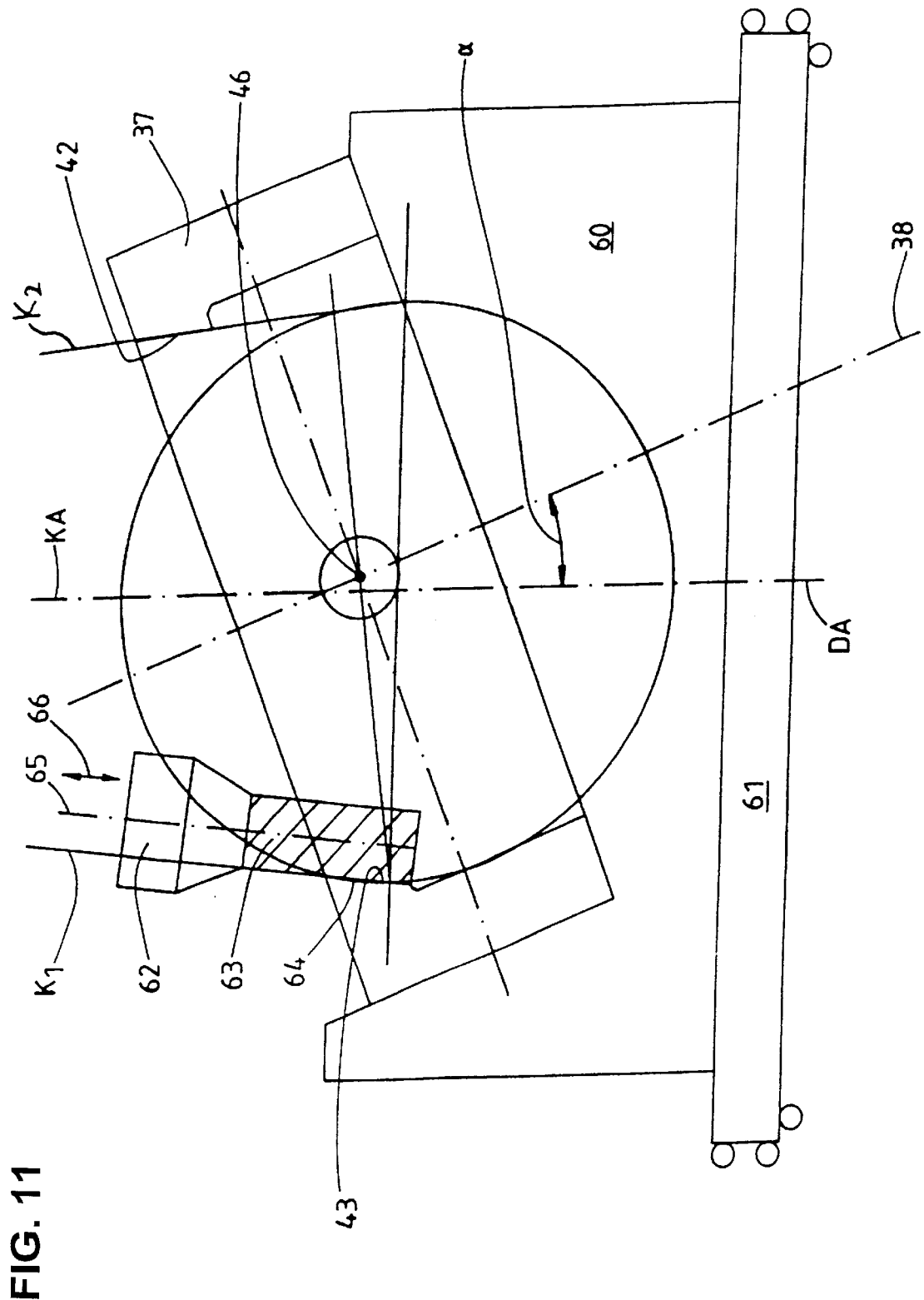
FIG. 11 shows a housing of the shut-off flap according to FIG. 10, chucked on the turntable.
Figure 12:
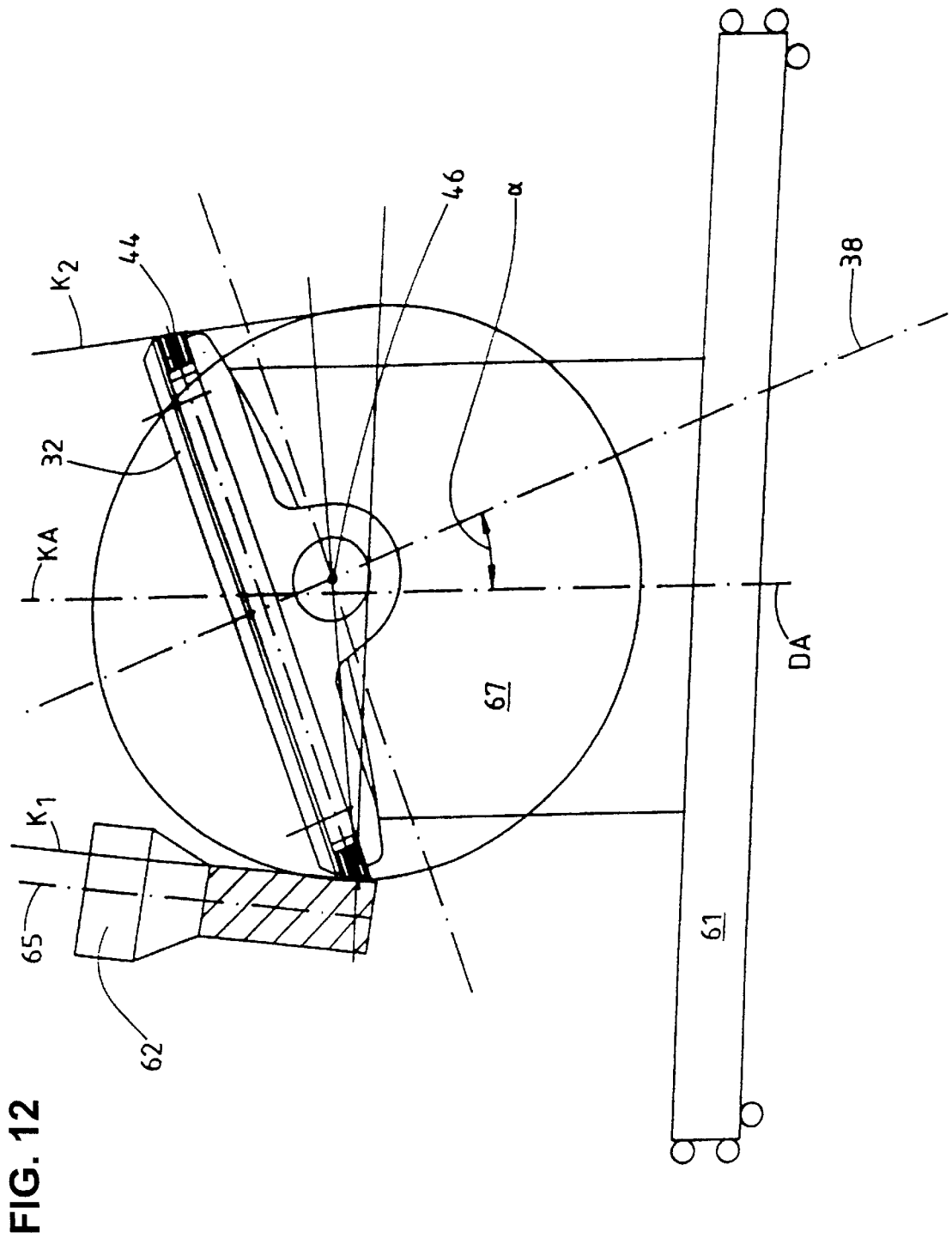
FIG. 12 shows a flap disc according to FIG. 10, chucked on the turntable.

FIGS. 10 to 12 illustrate the production of the seat cone. Thus, FIG. 10 illustrates a functional overview, with the flap disc 32 and the housing 37 being illustrated. In actual fact, the two parts are manufactured independently of one another, according to FIGS. 11 and 12.

According to FIG. 11, the housing 37 is chucked in a specific angular position in an auxiliary fixture 60. The angle α is obtained between the major axis 38 and the taper axis KA. The latter is at the same time the axis of rotation DA for a turntable 61 explained below.

The auxiliary fixture 60 is arranged fixedly on the turntable 61. A rotating tool 62, for example a milling cutter or a grinding wheel, is held above the auxiliary fixture 60. The tool 62 is oriented with a cylindrical surface 63 parallel to the taper envelope or to the taper line K1. This results correspondingly in a straight machining line 64 due to the removal of material by the tool 62, in the present case in the region of the peripheral sealing surface on the housing 37. The tool 62 rotates about an axis 65 which runs parallel to the desired contour of the sealing surface and to the taper envelope.

Machining takes place in what is known as a CNC milling center. The turntable 61 in this case constitutes the B-axis. During machining, the peripheral sealing surface 42, 43 is worked out of the housing 37 as a result of the relatively rapid rotation of the tool 63. At the same time, and, as compared with this, slow rotation of the turntable 61 takes place, in conjunction with an axial movement of the tool 62 according to the arrow 66. The exact orientation of the tool 62 according to the calculated taper envelope and the likewise exact positioning of the housing 37 by means of the auxiliary fixture 60 are important.

According to FIG. 12, the flap disc 32 is provided with sealing lamellae 44. Their outside diameters must likewise be adapted to the seat cone or the taper envelope. For this purpose, the flap disc 32 is fastened on the turntable 61 on a further auxiliary fixture 67 and is machined by means of the tool 62 in the same way as the housing 37 was previously, but from outside. The axis 65 accordingly lies outside the taper envelope (taper lines K1, K2). During machining, as a result of the rotation of the table 61, an observer sees the movement of the housing 37 and of the flap disc 32 as a wobbling movement. The peripheral sealing surface lies, in spatial terms, on the envelope of the calculated taper. The geometric conditions result in an elliptic shape for the sealing surface.

Figure 13:
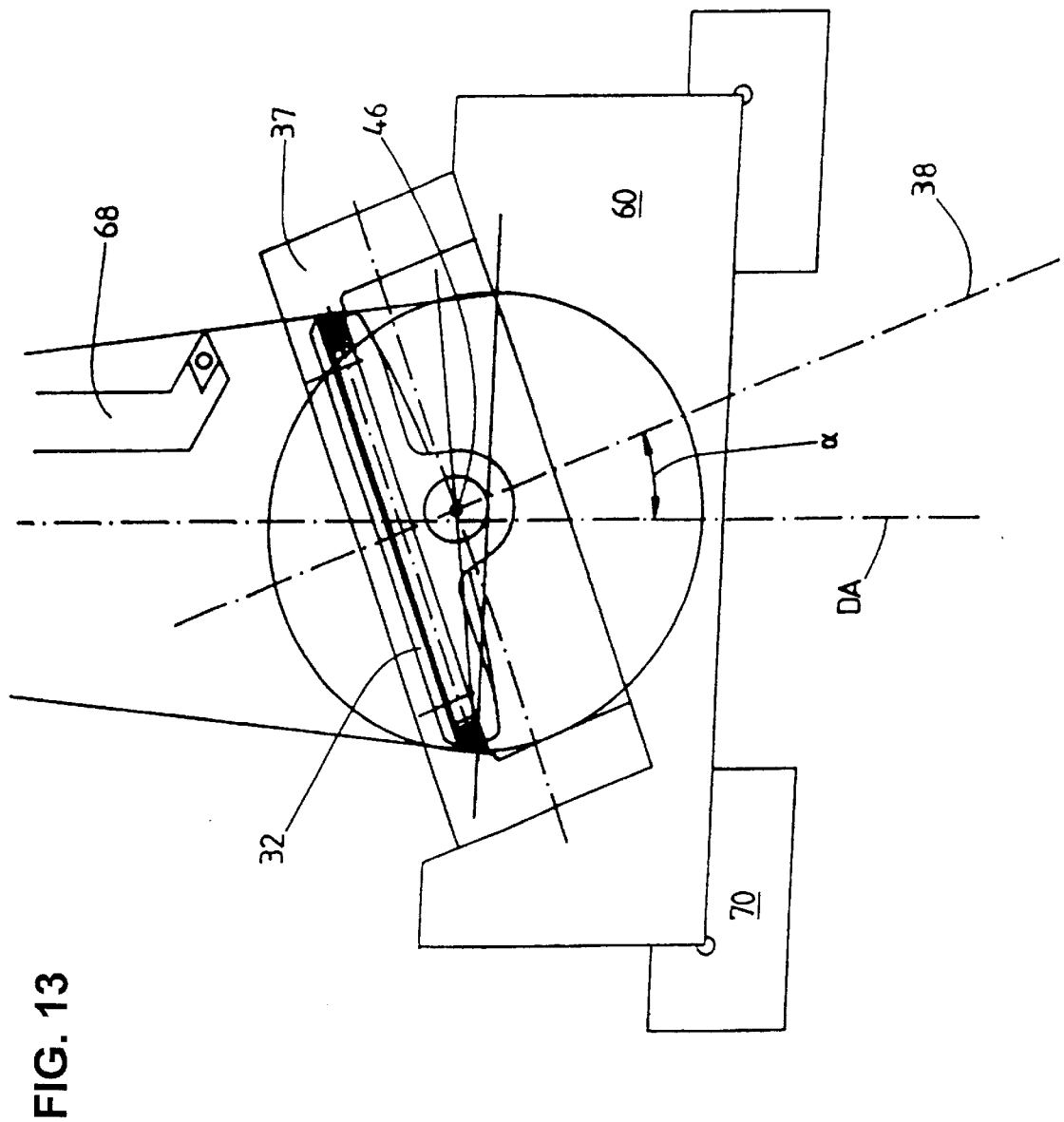
FIG. 13 shows an illustration similar to that of FIG. 10, but for somewhat different machining.
Figure 14:
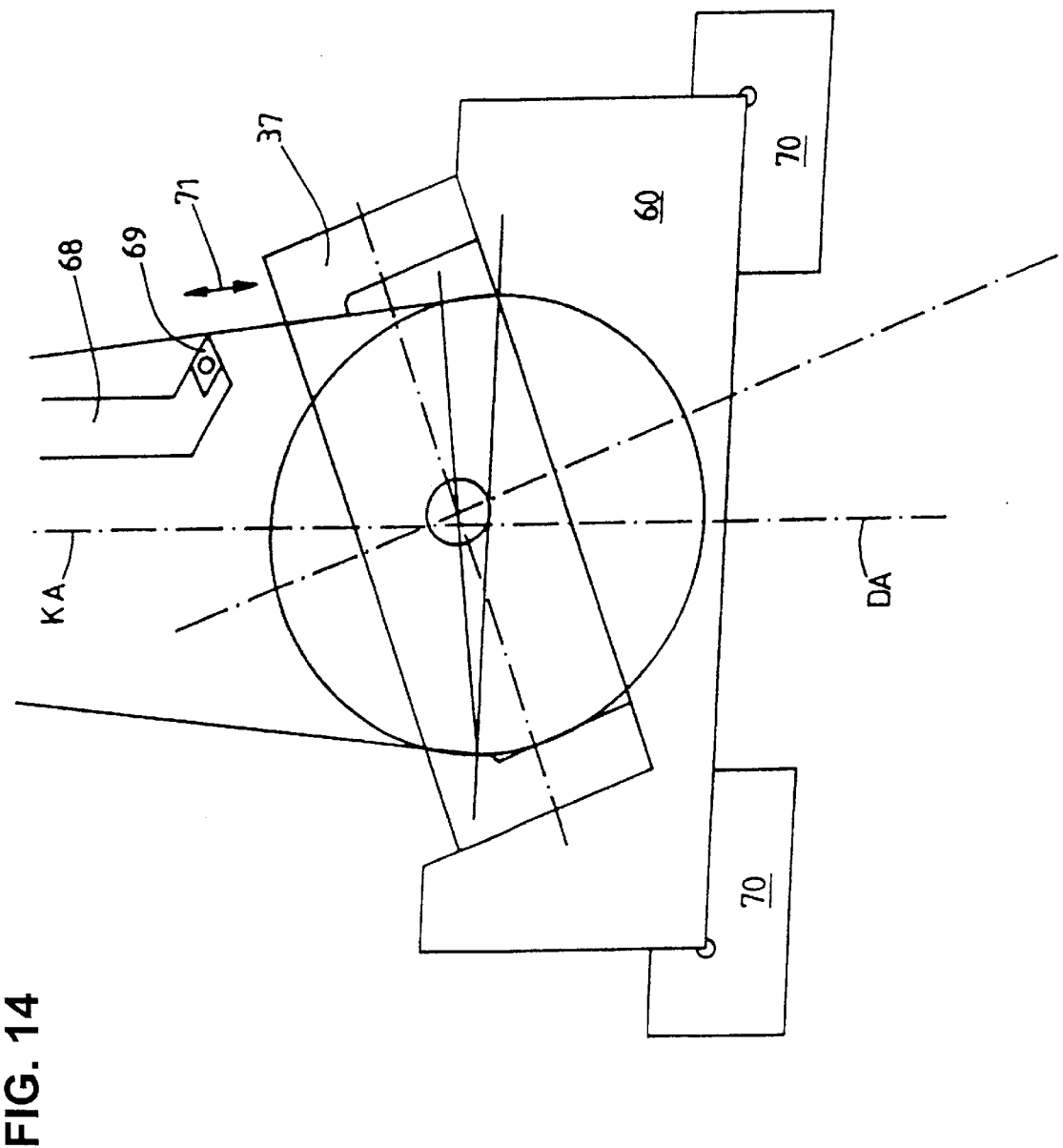
FIG. 14 shows an illustration similar to that of FIG. 11.
Figure 15:
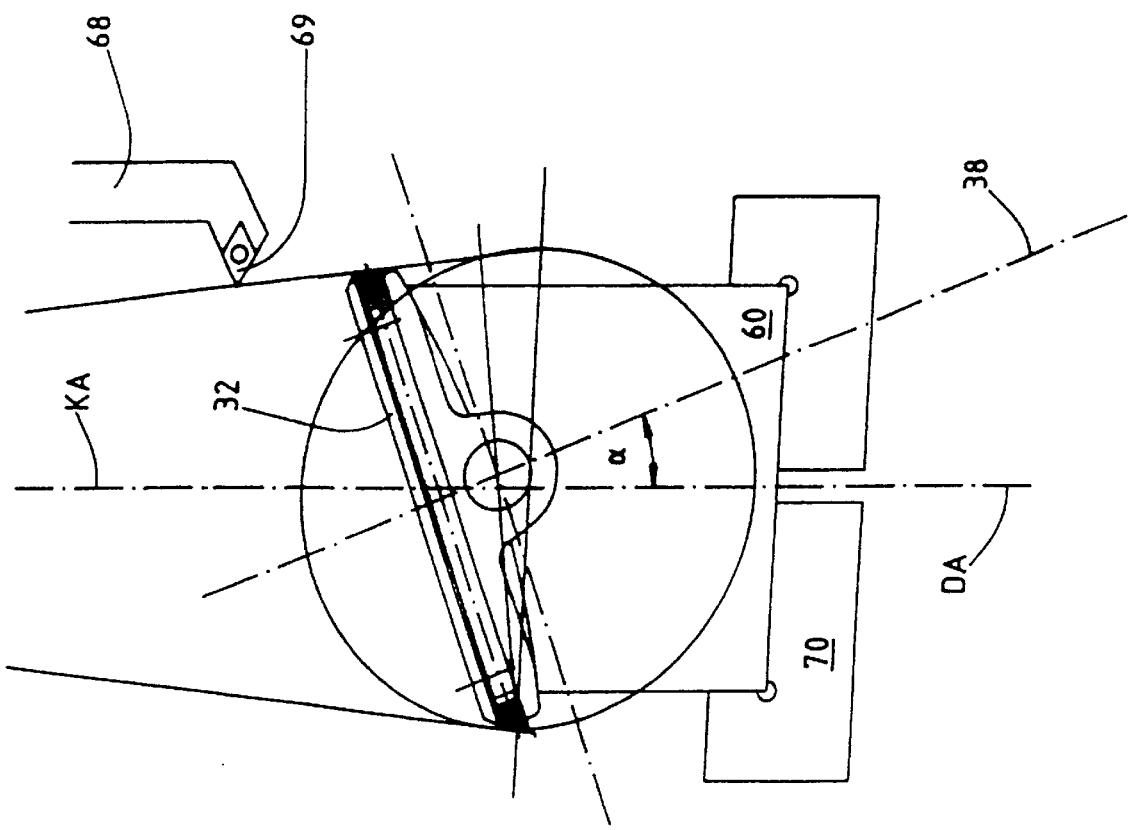
FIG. 15 shows an illustration similar to that of FIG. 12, FIG. 16 to 19 show geometrical explanations for determining the dimensions required for the design.
Figure 16:
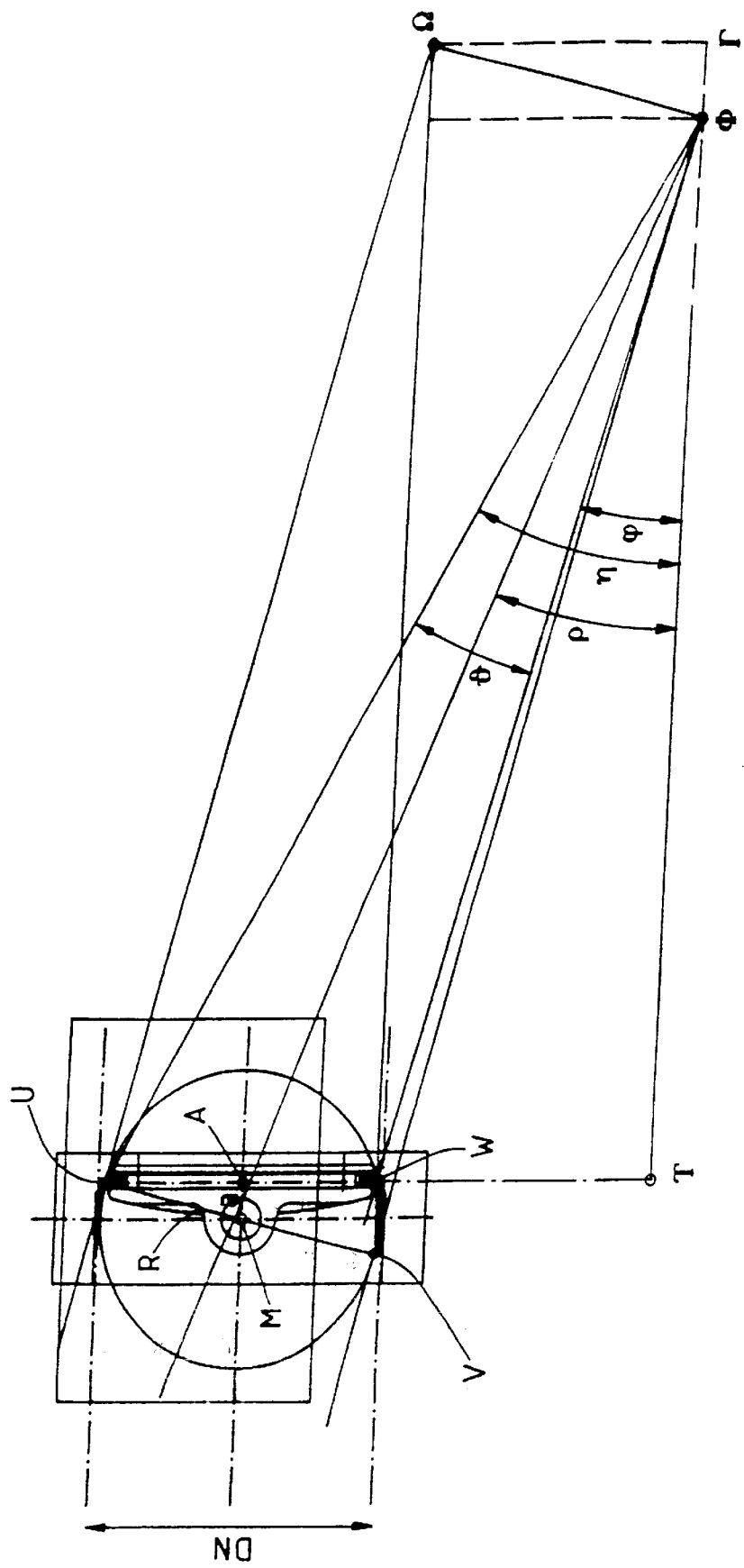
Figure 17:
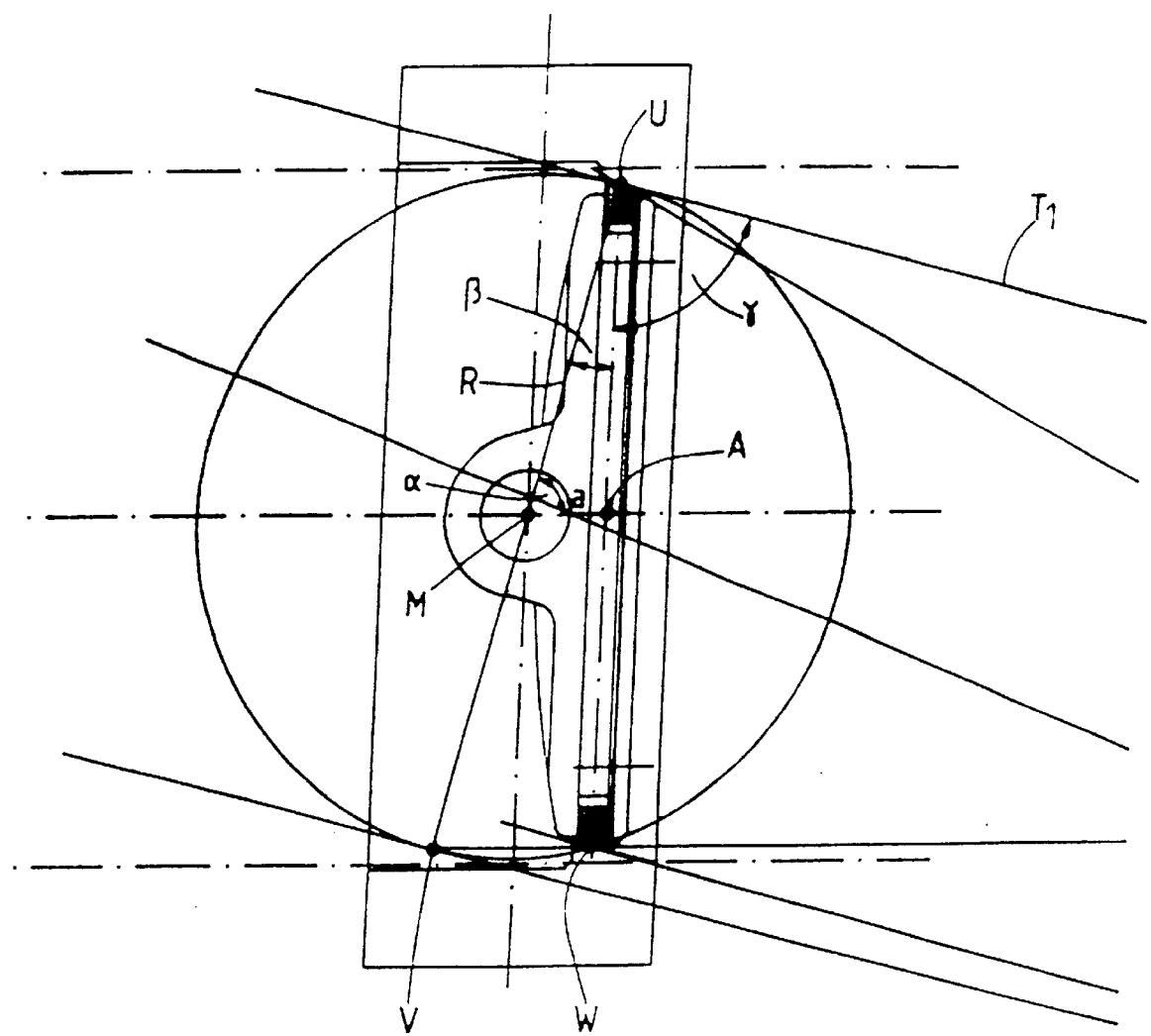
Figure 18:
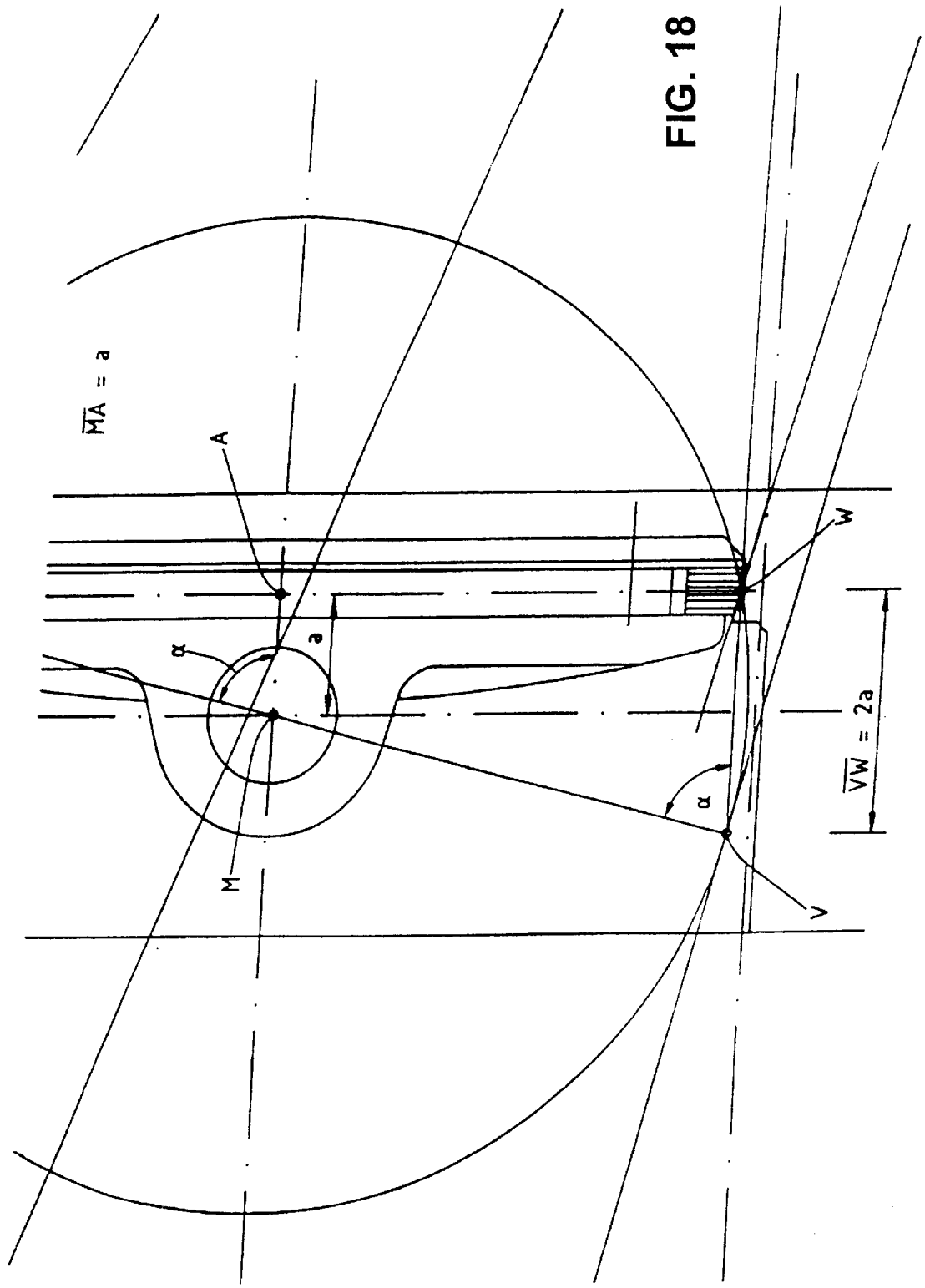
Figure 19:
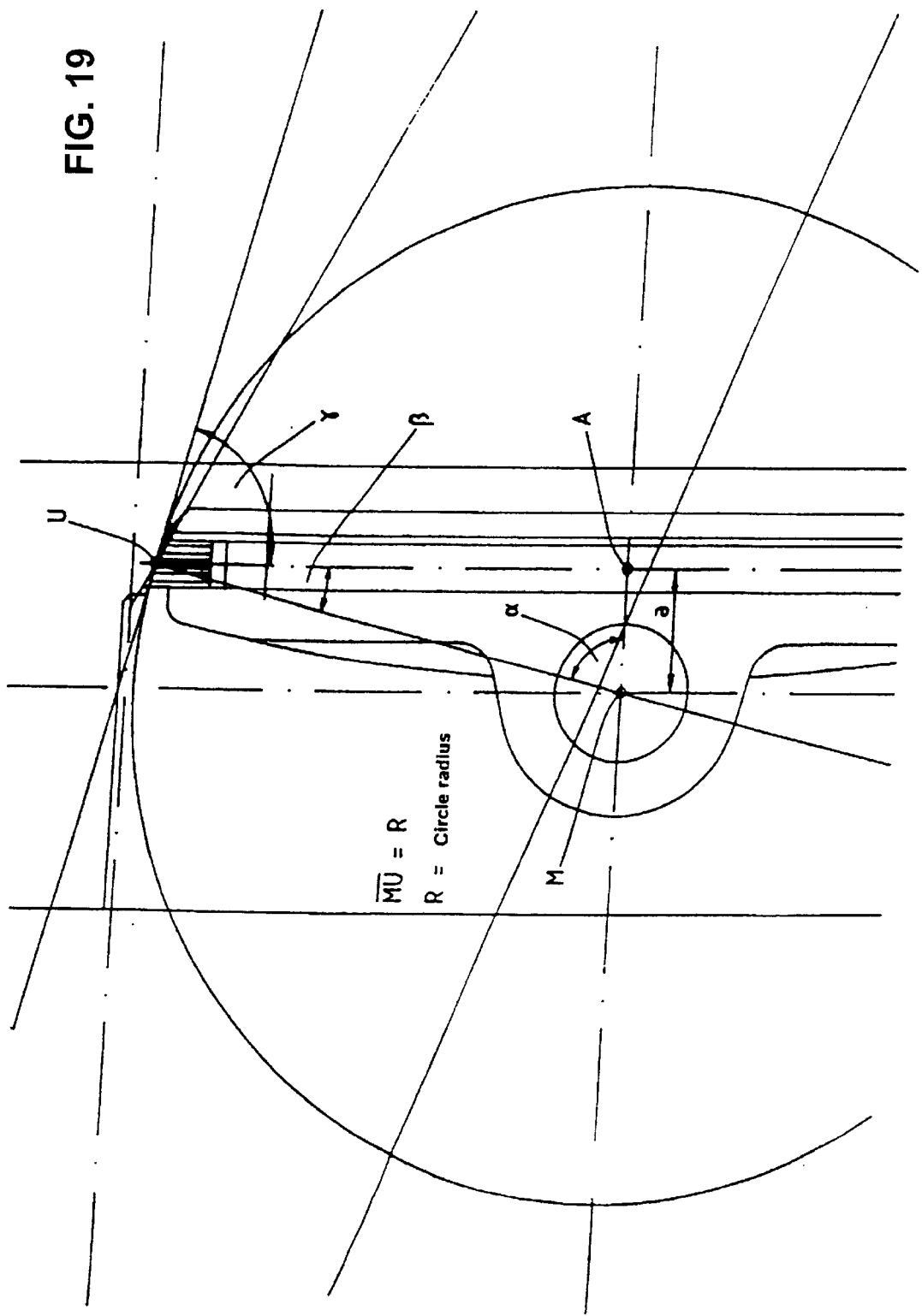

A somewhat different type of machining is shown in FIGS. 13 to 15. FIG. 13 shows, again, an assembly of all the parts, in a similar way to FIG. 10.

FIG. 14 shows the machining of the housing 37. In contrast to FIG. 11, here, a non-rotating tool 68 is provided, which has a cutting edge 69. The housing 37 is again fixed in an auxiliary fixture 60. The latter is chucked in chucking jaws 70 of a lathe chuck. For machining, the housing 37 is rotated about the taper axis KA (at the same time the axis of rotation DA), whilst the tool 68 is moved merely in the direction of the arrow and parallel to the taper envelope, see the arrow 71.

The production of the contour in the region of the flap disc 32 again takes place by machining from outside, in a similar way to FIG. 12.

Instead of the production methods described, others may also be used, for example machining by lasers or water-jet cutting.

The calculation of the construction data is explained below with reference to FIGS. 16 to 19. The indices and variables used differ from those given above. For construction purposes, the pivoting radius of a shut-off flap is given as R and the distance a from the axis of rotation to the sealing plane is given as $(\overline{WAU})$.

R derives from the requirement for the nominal width. a results from static reasons of rigidity (material selection, pressure requirements, etc.). The axis of rotation passes through the pipe axis.

The following applies: R segment $\overline{MU}$, of course also segment $\overline{MV}$ and $\overline{MW}$
a=segment $\overline{MA}$.

Determination of the dimensions necessary for construction:

Determination of the angle α:

$$\cos\alpha = \frac{a}{R} \Rightarrow \alpha = \arccos\left(\frac{a}{R}\right) \qquad \text{Equation (I)}$$

Determination of angle β:

$$\sin\beta = \frac{a}{R} \Rightarrow \beta = \arcsin\left(\frac{a}{R}\right) \qquad \text{Equation (II)}$$

Determination of angle γ:

$$\gamma = 90° - \beta = 90° - \left(\arcsin\left(\frac{a}{R}\right)\right) \qquad \text{Equation (III)}$$

Determination of segment $\overline{UW}$:

$$\overline{UW} = 2\overline{UA} = 2a\tan\alpha = 2a\tan\left[\arccos\left(\frac{a}{R}\right)\right] \qquad \text{Equation (IV)}$$

Determination of the point Ω through segment $\overline{W\Omega}$:

$$\overline{W\Omega} = \overline{UW}\tan\gamma = 2a\tan\left[\arccos\left(\frac{a}{R}\right)\right]\tan\left[90° - \left(\arcsin\left(\frac{a}{R}\right)\right)\right] \qquad \text{Equation (V)}$$

$$\overline{W\Omega} = 2a\tan\left[\arccos\left(\frac{a}{R}\right)\right]\tan\left[90° - \arcsin\left(\frac{a}{R}\right)\right]$$

For further calculation, the position of point Φ must be determined:

The subsidiary right-angled triangle consisting of the boundary points Ω, Φ and Γ is congruent with the triangle bounded by the points U, V and W.

The following therefore applies: Segment $\overline{\Phi\Gamma}$=2a

Segment $\overline{\Gamma\Omega}$=$\overline{UW}$=$2\overline{UA}$ (see Equation IV.).

The following therefore applies to segment $\overline{T\Phi}$:

$$\overline{T\Phi} = \overline{W\Omega} - \overline{\Phi\Gamma} = \overline{W\Omega} - 2a \qquad \text{Equation (VI)}$$

$$\overline{T\Phi} = 2a\tan\left[\arccos\left(\frac{a}{R}\right)\right]\tan\left[90° - \arcsin\left(\frac{a}{R}\right)\right] - 2a$$

The size and position of the taper angles can then be determined as follows:

$$\tan\varphi = \frac{\overline{TW}}{\overline{T\Phi}} = \frac{\overline{\Gamma\Omega}}{\overline{T\Phi}} = \frac{\overline{UW}}{\overline{T\Phi}} = \frac{2\overline{UA}}{\overline{T\Phi}} \qquad \text{Equation (VII)}$$

$$\varphi = \arctan\left\{\frac{2a\tan\left[\arccos\left(\frac{a}{R}\right)\right]}{2a\tan\left[\arccos\left(\frac{a}{R}\right)\right]\tan\left[90° - \arcsin\left(\frac{a}{R}\right)\right] - 2a}\right\}$$

Determination of the angle η:

$$\tan\eta = \frac{\overline{TU}}{\overline{T\Phi}} = \frac{\overline{TW} + \overline{UW}}{\overline{T\Phi}} = \frac{2x\overline{TW}}{\overline{T\Phi}} = \frac{2x\overline{UW}}{\overline{T\Phi}} \qquad \text{Equation (VIII)}$$

$$\eta = \arctan\left\{\frac{4a\tan\left[\arccos\left(\frac{a}{R}\right)\right]}{2a\tan\left[\arccos\left(\frac{a}{R}\right)\right]\tan\left[90° - \arcsin\left(\frac{a}{R}\right)\right] - 2a}\right\}$$

The taper angle $\upsilon$ therefore becomes:

$$\vartheta = \eta - \varphi = \arctan\left\{\frac{4a\tan\left[\arccos\left(\frac{a}{R}\right)\right]}{2a\tan\left[\arccos\left(\frac{a}{R}\right)\right]\tan\left[90° - \arcsin\left(\frac{a}{R}\right)\right] - 2a}\right\} - \arctan\left\{\frac{2a\tan\left[\arccos\left(\frac{a}{R}\right)\right]}{2a\tan\left[\arccos\left(\frac{a}{R}\right)\right]\tan\left[90° - \arcsin\left(\frac{a}{R}\right)\right] - 2a}\right\}$$

Equation (IX)

The position of the taper center is described by the angle:

$$\rho = \frac{\vartheta}{2} + \varphi = \frac{\eta - \varphi}{2} + \varphi = \frac{\eta + \varphi}{2}$$

Equation (X)

Using for the ratio of the axis of rotation distance a and the radius R:

$$\varepsilon = \frac{a}{R},$$

a simplified notation is obtained for the above equations from (I.) to (X.).

If, moreover, the term $$2a\tan\left[\arccos\left(\frac{a}{R}\right)\right]$$

is replaced by the concept σ, the equations I to X can be shortened as follows:

$$\alpha = \arccos\varepsilon$$ Equation (I.)

$$\beta = \arcsin\varepsilon$$ Equation (II.)

$$\gamma = 90° - \arcsin\varepsilon$$ Equation (III.)

$$\overline{UW} = \sigma$$ Equation (IV.)

$$\overline{W\Omega} = \sigma\tan[90° - \arcsin\varepsilon]$$ Equation (V.)

$$\overline{T\Phi} = \sigma\tan[90° - \arcsin\varepsilon]2a$$ Equation (VI.)

$$\varphi = \arctan\frac{\sigma}{\sigma\tan[90° - \arcsin\varepsilon] - 2a}$$ Equation (VII)

$$\eta = \arctan\left\{\frac{2\sigma}{\sigma\tan[90° - \arcsin\varepsilon] - 2a}\right\}$$ Equation (VIII)

$$\vartheta = \arctan\left\{\frac{2\sigma}{\sigma\tan[90° - \arcsin\varepsilon] - 2a}\right\} - \arctan\left\{\frac{\sigma}{\sigma\tan[90° - \arcsin\varepsilon] - 2a}\right\}$$ Equation (IX)

$$\rho = \frac{\arctan\left\{\frac{2\sigma}{\sigma\tan[90° - \arcsin\varepsilon] - 2a}\right\} + \arctan\left\{\frac{\sigma}{\sigma\tan[90° - \arcsin\varepsilon] - 2a}\right\}}{2}$$ Equation (X)

The forces during the closure of the shut-off flap are explained below with reference to FIG. 20 to 23. The flap disc is provided with a sealing element in the form of sealing lamellae 44, see FIG. 2 and 3. For simplification, FIG. 20 to 23 assume a single spring ring 71. This may alone form the sealing element of the flap disc or, together with further thin sealing rings, produce a lamellar assembly. It is assumed below that the sealing element of the flap disc is relatively thin, and therefore only the single spring ring 71 floating in a peripheral socket or groove is provided.

During the closing of the shut-off flap, the spring ring 71 comes to bear on the peripheral sealing seat of the flap housing. By virtue of the rotating closing movement, arrow 72, a high pressure acts on lateral region 73, 74, which is caused by the tapered shape of the sealing seat, comparable, for example, to the run onto an inclined plane.

No inwardly directed forces act on the upper circumferential region 52 and the lower circumferential region 53, since, here, the spring ring 71 intersects the axis of rotation (center of rotation 46). Accordingly, in these circumferential regions 52, 53, an outwardly directed pressure of the spring ring 71 occurs as a reaction. The spring ring 71 therefore fits automatically into the sealing seat. The forces which occur are uniformly distributed or transmitted by virtue of the elasticity of the spring ring 71. It is important for this purpose, at the same time, that the spring ring 71 be mounted in such a way that the latter can execute adapting or yielding movements transversely to the flow direction.

Figure 22:
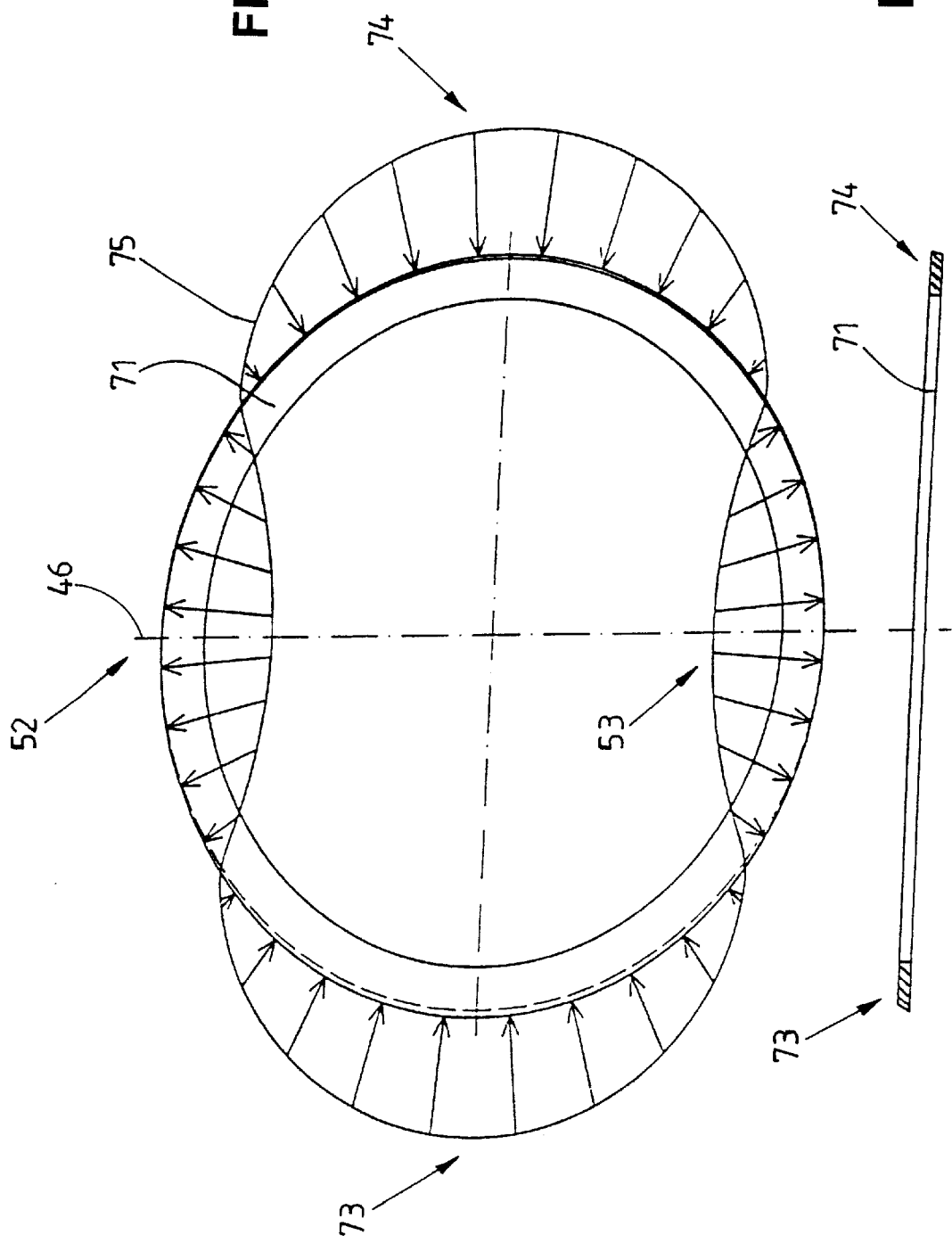
FIG. 22 shows a further graphic illustration of the forces occurring, according to FIG. 20, FIG. 23 corresponds to FIG. 21.
Figure 23:
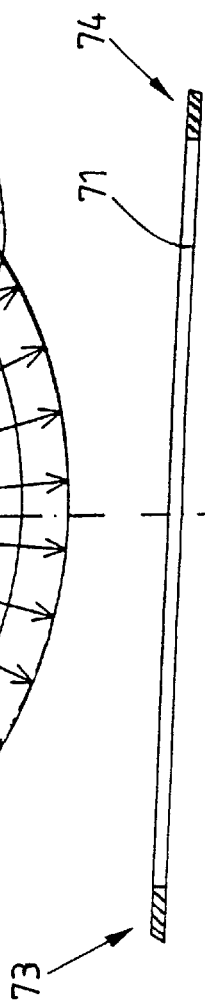

FIG. 22 illustrates graphically the forces which occur. A contracted circle 75 defines the various forces by means of its deviation with respect to the outside diameter of the spring ring 71. In the lateral regions 73, 74, the pressure forces acting on the spring ring 71 from outside are the greatest, whilst, in the upper and lower circumferential regions 52, 53, the reaction forces resulting from them predominate. These are, of course, directed outwards.

The elliptic shape of the flat disc or of the sealing seat is explained below with reference to FIG. 24 and 25. As already illustrated above, the sealing seat, that is to say the peripheral sealing surface in the flap housing 37, is part of a taper envelope with the taper apex S1. Since the taper apex S1 does not lie on the major axis 38, the associated taper section runs at an angle to the taper axis KA which is different from 90° and is in the form of an ellipse. The peripheral sealing surface thus has two diameters corresponding to the dimensions of an ellipse which are customary in mathematics, to be precise a large diameter 2a and a small diameter 2b. In this case, in FIG. 24, the large diameter 2a corresponds to the segment between the points A and C. The small diameter 2b, the height of the flap disc 32, results from a line 76, perpendicular to the taper axis KA, through a point p, this perpendicular intersecting the intersection point 56 of the seal center line 39 with the major axis 38. Intersection points s and t of the line 76 with the envelope lines K1 and K2 of the generated taper can also be seen. The small diameter 2b is equal to the distance between the points s and t along the line 76.

Figure 24:
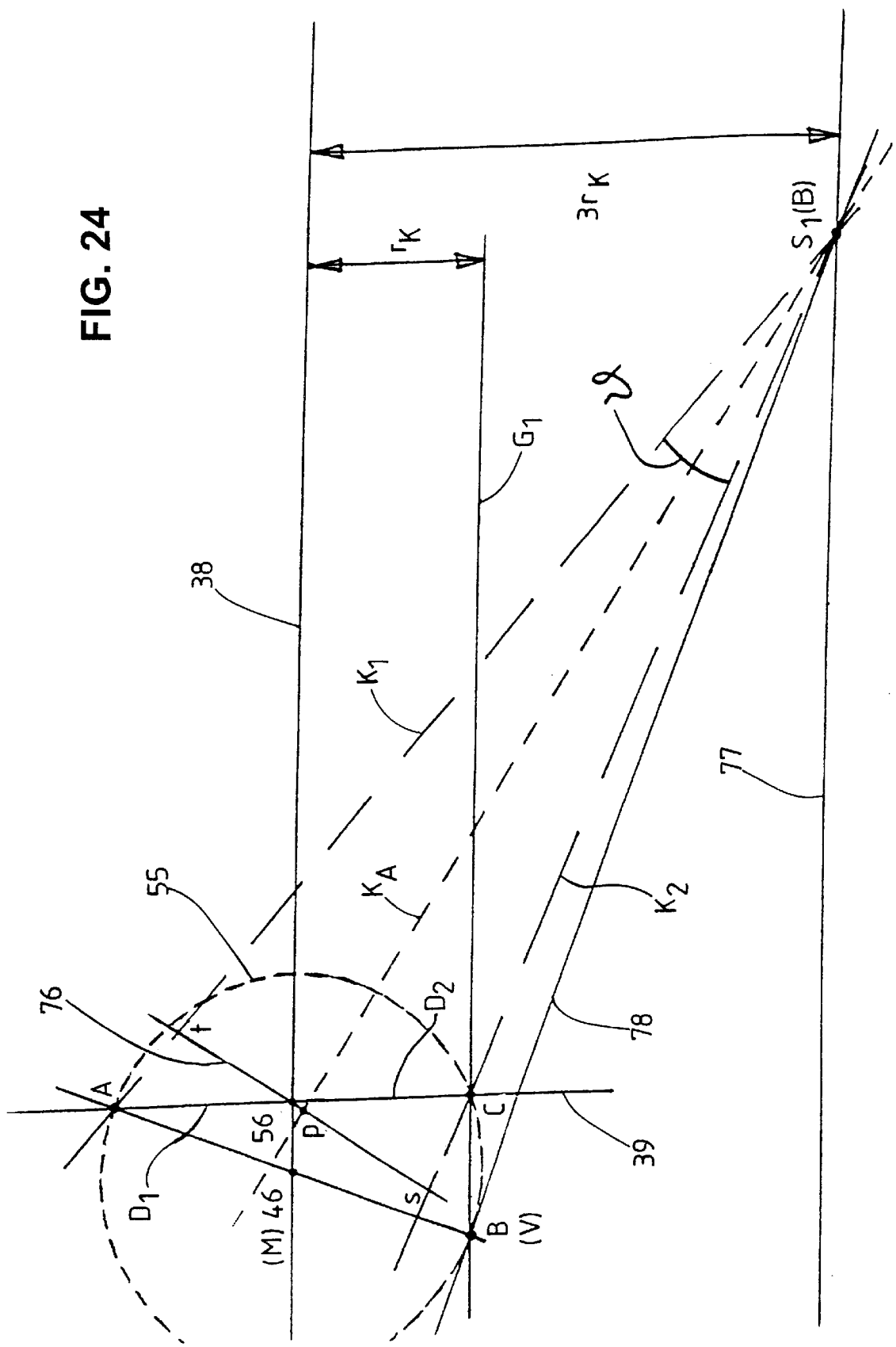
FIG. 24 shows an illustration similar to that of FIG. 8 and 16 for explaining a further method of calculation for the taper apex S1 and the elliptic shape of the sealing seat.

According to FIG. 24, the point S1 lies on a line 77 parallel to the major axis 38, the parallel line 77 being at a distance from the major axis 38 corresponding to three times the flap radius rk (rk=the distance between the points 56 and C). The location of the point S1 on the parallel line 77 is obtained from the tangent 78 to the sealing circle 55 at the point B (or the point V in FIG. 16 to 18). Thus, the further the center of rotation 46 is away from the seal center line 39 (eccentricity of the shut-off flap), the further the point S1 travels on the parallel line 77 to the left in the direction of the seal center line 39.

Figure 25:
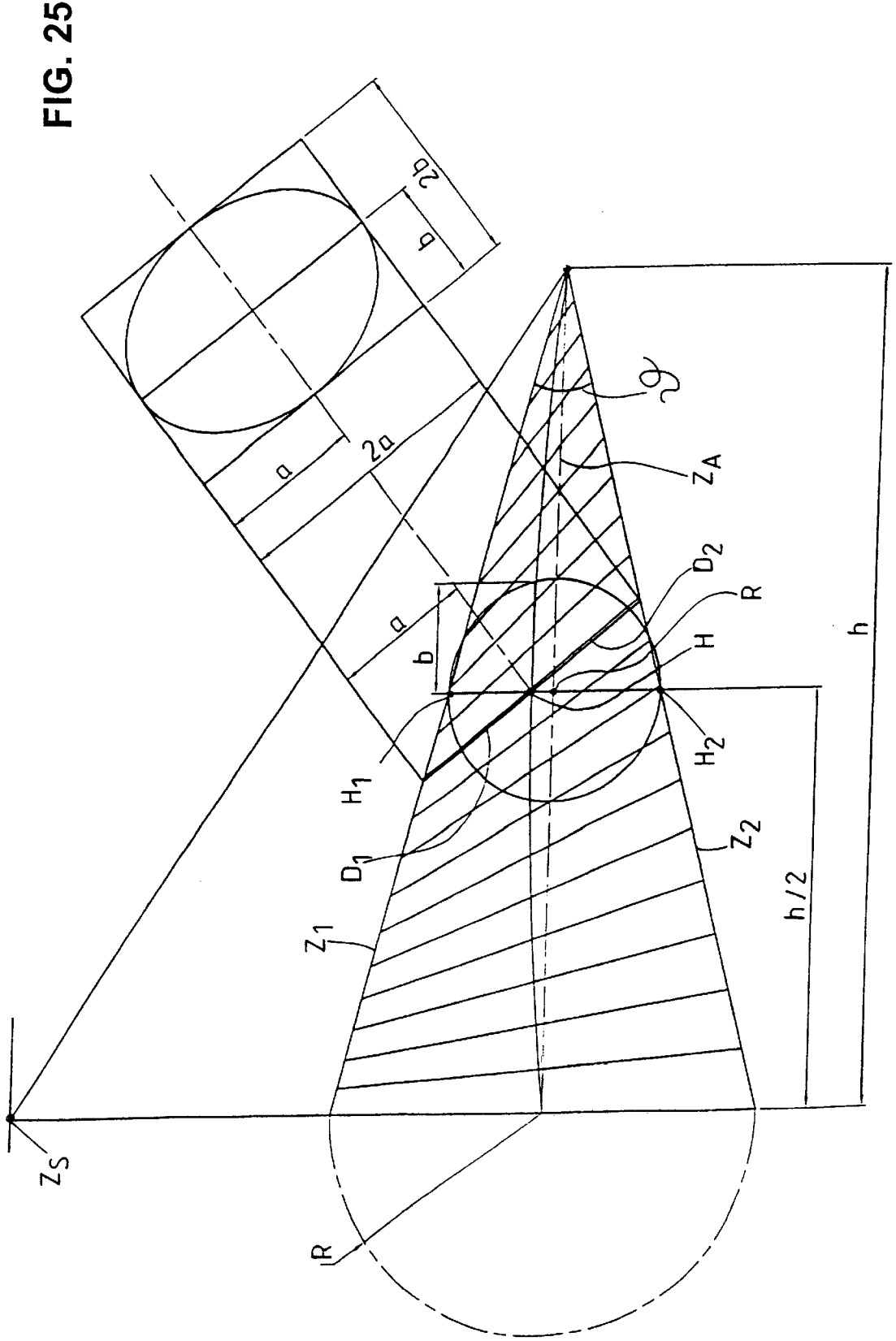
FIG. 25 shows a projection for a further explanation of the elliptic shape.

The elliptic shape of the peripheral seal can be understood from FIG. 25. A taper with a taper apex Z and generatrices Z1, Z2 has a taper axis ZA which at the same time is the bisecting line of the taper angle $\upsilon$. A section through the circular taper through a point H at half the height of the taper and perpendicularly to the taper axis ZA results in intersection points H1, H2 with the generatrices Z1 and Z2. The associated oblique taper section is marked by a double line. This consists of two portions D1 and D2 of equal length, both in each case having the length a. The point H between the portions D1 and D2 does not lie on the taper axis, but at a distance from the intersection point p of the taper axis. The distance between the points H and p is a measure of the eccentricity according to the rules for calculating an ellipse. To be precise, the linear eccentricity e of an ellipse is obtained as $e=\overline{a^2-b^2}$ and the numerical eccentricity $\epsilon$ is obtained as $\epsilon=e/a$.

Depending on the position of the oblique taper section, the point H comes to lie at a greater or lesser distance from the taper axis ZA. In this respect, some taper sections, starting from the point ZS are depicted in FIG. 25. The height of the ellipse of the taper section through the point H can also be seen. The ellipse has a height $2b$ which corresponds to the distance between the points H1 and H2. The points H and p of FIG. 25 correspond to the points 56 and p in FIG. 24. For greater clarity, the portions D1 and D2 are also depicted there.

The particular feature of the shut-off flap according to the invention, precisely in conjunction with a relatively thin spring ring or sealing ring, is the low actuating torque, as compared with conventional shut-off flaps. In the case of a theoretically infinitely thin sealing ring, the forces described in the introduction, causing a self-closing or self-holding effect, no longer occur. Due to the symmetrical flap arrangement—axis of rotation on the major axis 38=single eccentricity—the forces prevailing on both sides of the flap disc as a result of different pressures are compensated. The actuating torques necessary for opening and closing the flap are relatively low. A drive can have correspondingly small dimensions.

Figure 26:
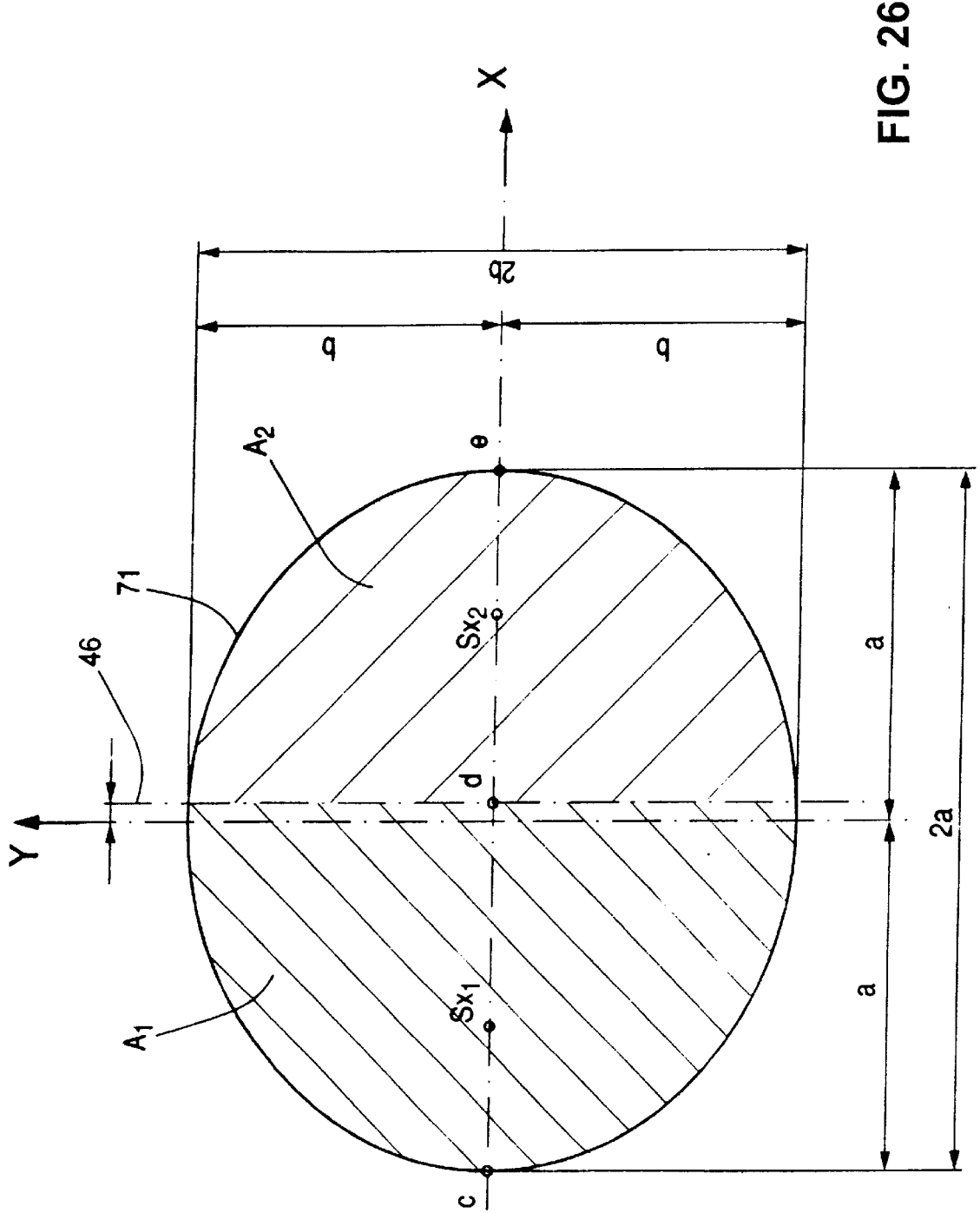
FIG. 26 shows an illustration of the flow cross section in the shut-off flap to explain the forces and torques which occur.

With the flap closed, different pressures on the two sides of the flap disc give rise to a slight flexion of the latter which, of course, is greatest at mid-height—along the X-axis in FIG. 26. Due to the flexion and the previously explained taper-seat arrangement, a transverse displacement of the sealing ring or spring ring 71 occurs. However, this transverse displacement is so slight that it only slightly increases the actuating torques required. The torques taking effect perpendicularly to the closed flap disc after the displacement of the spring ring 71 are explained below with reference to FIG. 26 and to the resulting equations. The explanations also apply to thick sealing rings or assemblies of sealing lamellae and to the resulting different torques on both sides of the flap disc. The following apply:

$$A_1 = 2\int_c^d y\,dx \text{ with } y = f(x) \quad \text{(XI.)}$$

$$A_2 = 2\int_d^c y\,dx \text{ with } y = f(x) \quad \text{(XII.)}$$

$$Sx_1 = \frac{\int_c^d y^2\,dx}{2\int_c^d y\,dx} \quad \text{(XIII.)}$$

$$Sx_2 = \frac{\int_d^c y^2\,dx}{2\int_d^c y\,dx} \quad \text{(XIV.)}$$

$$\Sigma Mi = 0 = M_1 - (M_2 \Delta M) \quad \text{(XV.)}$$

$$\Delta M = M_1 - M_2 \quad \text{(XVI.)}$$

$$\Delta M = \left\{P^* 2^* \int_c^d y\,dx^* \frac{\int_c^d y^2\,dx}{2\int_c^d y\,dx}\right\} - \left\{P^* 2\int_d^c y\,dx^* \frac{\int_d^c y^2\,dx}{2^*\int_d^c y\,dx}\right\} \quad \text{(XVII)}$$

$$\Delta M = P^* \left\{\left[\int_c^d y\,dx^* \frac{\int_c^d y^2\,dx}{\int_c^d y\,dx}\right] - \left[\int_d^c y\,dx^* \frac{\int_d^c y^2\,dx}{\int_d^c y\,dx}\right]\right\} \quad \text{(XVIII)}$$

$$M_{R(\varphi)} \approx F_A^* \overline{R}\left(\frac{1}{\pi} - \frac{1}{2}\sin\varphi\right) \quad \text{(XIX)}$$

with $(0° \leq \varphi \leq 180°)$ and $\overline{R} = \frac{a+b}{2}$ and $0.9 \leq \frac{b}{a} \leq 1$ The spring ring 71 with the associated flap disc forms a surface in the form of an ellipse with a long diameter $2a$ (width) and a short diameter $2b$ (height). The center of rotation 46 of the flap disc is arranged so as to be offset with respect to the bisecting line (y-axis) of the width of $2a$. In conjunction with a pressure difference on the two sides of the flap disc, a resultant torque occurs, which assists or brakes an adjustment of the flap disc, depending on the direction or the sign. The areas on both sides of the perpendicular line defined by the center of rotation 46 are calculated by means of the equations (XI.) and (XII.). The function applicable to an ellipse is to be adopted here as the function $y=f(x)$. By means of the general formula $y=f(x)$, the torques on flap discs of a different shape can also be calculated by means of the equations (XI.) to (XVIII.). The function merely has to be determinable. The effective lever arms are determined by means of the position of the pressure centers of gravity SX1 and SX2, see equations (XIII.) and (XIV.). The resultant torque, see equations (XV.) to (XVIII.), is obtained from the difference between the individual torques, these being determined via the effective pressure p, the calculated areas A1 and A2 and the effective lever arms SX1 and SX2. In equation (XVIII.), the respective quantities are substituted and as far as possible are cancelled out. The end points c, d and e which are important for the integral can be seen from FIG. 26. c and e are at the same time the lateral edge points of the spring ring 71 after the transverse displacement of the latter or the lateral edge points effective on that side of the flap disc which is viewed in each case, whilst d marks the location of the axis defined by the center of rotation 46.

Figures 20, 21:
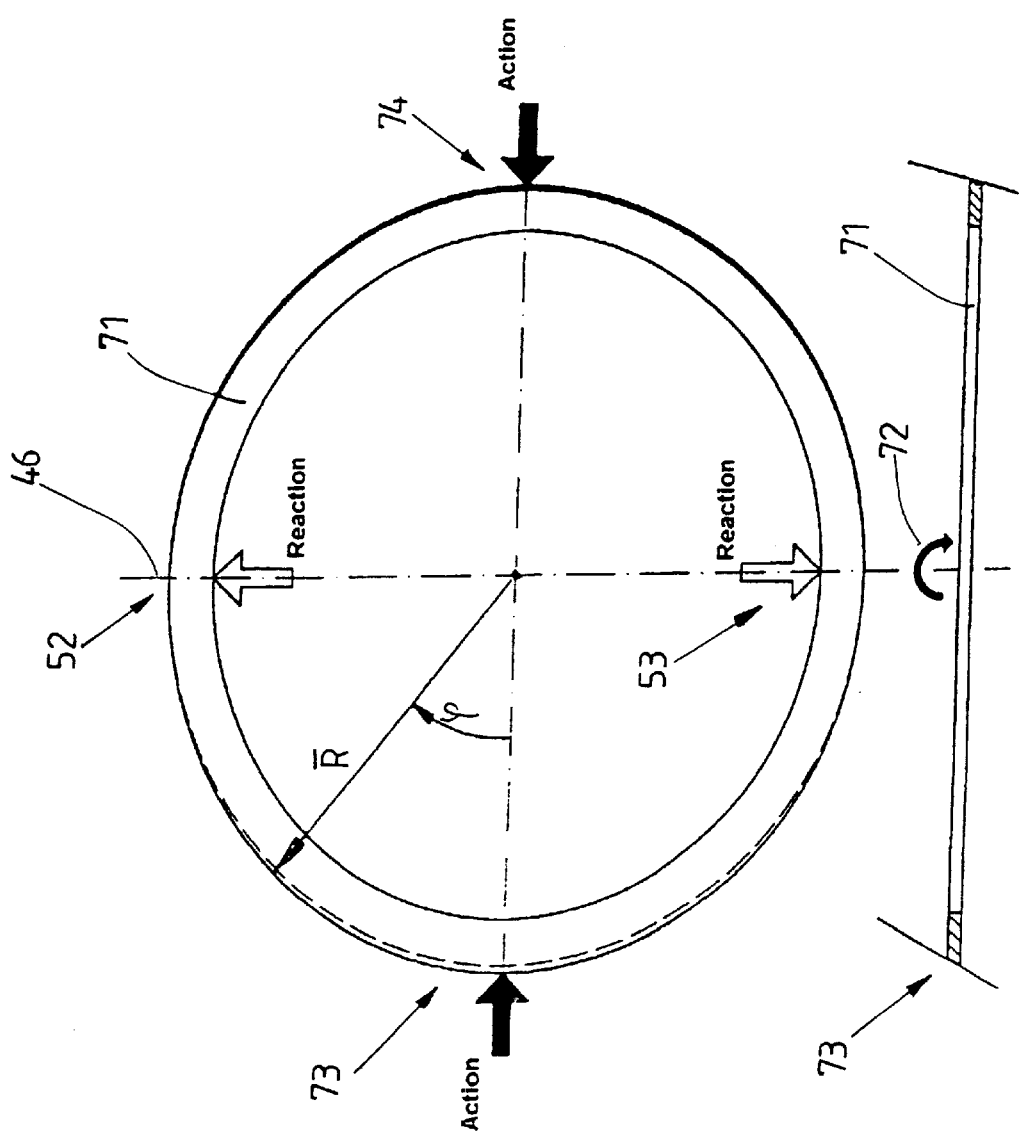
FIG. 20 shows an illustration of the forces occurring in the region of a peripheral sealing ring during the closing of the shut-off flap.
FIG. 21 shows a sealing ring in cross section.

Equation (XIX.) describes, in general, the bending moments occurring on the circumference of the spring ring 71 in FIG. 20, as a function of the angle φ of the radius R with respect to the horizontal, and triggered by the pressing of the lateral regions onto the cone seat of the peripheral sealing surface DF during the closing of the flap disc. FA designates the force taking effect in this case. The values for $(1/\pi - \frac{1}{2} \sin \phi)$ in the right-hand column of the following table are to correspond to the arrows, shown in FIG. 22, between the contracted circle 75 and the circumference of the spring ring 71. Equation (XIX.) reproduces a very accurate value for the moment MR(φ), insofar as b/a is between 0.9 and 1.

Table to FIGS. 20 and 22

| φ | φ | ½ sin | (1/π − ½ sinφ) |
|---|---|---|---|
| 0 | 180 | 0 | 0.318 |
| 10 | 170 | 0.087 | 0.231 |
| 20 | 160 | 0.171 | 0.147 |
| 30 | 150 | 0.250 | 0.068 |
| 40 | 140 | 0.321 | −0.003 |
| 50 | 130 | 0.383 | −0.065 |
| 60 | 120 | 0.433 | −0.115 |

-continued

Table to FIGS. 20 and 22

| φ | φ | ½ sin | (1/π − ½ sinφ) |
|---|---|---|---|
| 70 | 110 | 0.470 | −0.152 |
| 80 | 100 | 0.492 | −0.174 |
| 90 | 90 | 0.5 | −0.182 |

Figure 27:
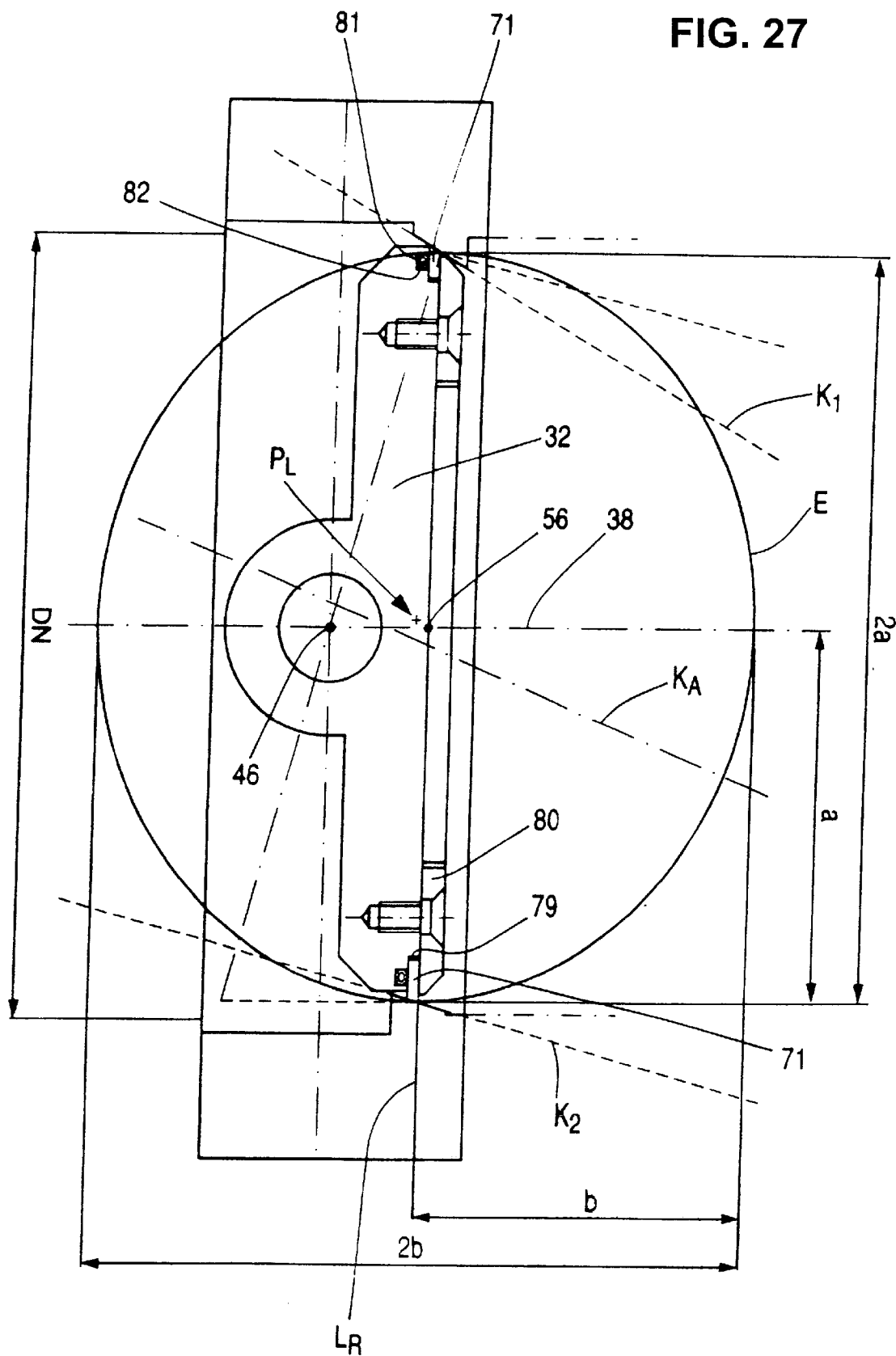
FIG. 27 shows an illustration similar to that of FIG. 9 and 17 for a further explanation of the elliptic shape.

Finally, FIG. 27 also shows the installation of the spring ring 71 in the flap disc 32. The spring ring 71 is held in a peripheral groove 79 which is formed by the flap disc 32 and a holding ring 80 which is screwed to the flap disc and the diameter of which is somewhat smaller than the outside diameter of the spring ring 71. A sealing ring 82 is arranged opposite the holding ring 80, that is to say on the other side of the spring ring 71, in an axially directed groove 81 of the flap disc 32, so that a medium shut off by the flap disc 32 cannot flow past the spring ring 71 on the inside.

FIG. 27 contains another special feature. The ellipse E depicted represents a taper section on the side of the spring ring 71 on the right in the figure, along the line LR. In this case, the ellipse E is bisected by the major axis 38 which intersects the center of rotation 46 and the point 56. If, instead, the taper section were to be taken along the left-hand side of the spring ring 71, there would be an intersection point of the corresponding taper section line (not shown) with the line bisecting the associated ellipse, exactly at the point PL, depicted as a small cross in FIG. 27.

The cone seat of the peripheral sealing surface DF is sharply defined by the taper apex S1 being indicated and produces a main taper which is designated in this way here. A cone seat with another basic taper is not ruled out. It should be possible to have tapers, the taper apex of which lies more closely to the major axis 38 and at the same time also more closely to the seal center line 39 than S1, see FIG. 24. This applies particularly to taper apices which lie within the main taper, that it to say between the generatrices K1 and K2.

In the exemplary embodiments described above, the taper provided is always a circular taper. In actual fact, a taper of a different shape is also possible, for example one in which the taper section for generating the peripheral sealing surface has a circularly round shape. In general, a taper section perpendicular to the taper axis should have a purely convex circumferential line or no concave portions. Only single eccentricity of the flap disc is important, at most only a slight distance of the axis of rotation from the major axis (slight double eccentricity), so that only slight differences in torque occur for different flow directions.

List of reference symbols

| | |
|---|---|
| 10 | Shut-off flap |
| 11 | Flap disc |
| 12 | Housing |
| 13 | Axis of rotation region |
| 14 | Sealing seat region |
| 15 | Sealing surface |
| 16 | Sealing surface |
| 17 | Major axis |
| 18 | Flow direction |
| 19 | Flow direction |
| 20 | Seal center line |
| 21 | Intersection point |
| 22 | Sealing circle |
| 23 | Arrow |
| 24 | Arrow |
| 25 | Right disc side |

-continued

List of reference symbols

| | |
|---|---|
| 26 | Left disc side |
| 27 | Side surface |
| 28 | Side surface |
| 29 | Side surface |
| 30 | Side surface |
| 31 | Shut-off flap |
| 32 | Flap disc |
| 33 | Arrow |
| 34 | Arrow |
| 35 | Arrows |
| 36 | Arrows |
| 37 | Housing |
| 38 | Major axis |
| 39 | Seal center line |
| 40 | Right side |
| 41 | Left side |
| 42 | Sealing surface |
| 43 | Sealing surface |
| 44 | Sealing lamellae |
| 45 | Taper axis |
| 46 | Center of rotation |
| 47 | Rotary shaft |
| 48 | Pipe flange |
| 49 | Pipe flange |
| 50 | Bearing |
| 51 | Bearing |
| 52 | Circumferential |
| 53 | Circumferential |
| 55 | Sealing circle |
| 56 | Intersection point |
| 60 | Auxiliary fixture |
| 61 | Turntable |
| 62 | Tool |
| 63 | Surface |
| 64 | Machining line |
| 65 | Axis |
| 66 | Arrow |
| 67 | Auxiliary fixture |
| 68 | Tool |
| 69 | Cutting edge |
| 70 | Chucking jaw |
| 71 | Spring ring |
| 72 | Arrow |
| 73 | Lateral region |
| 74 | Lateral region |
| 75 | Circle |
| 76 | Line |
| 77 | Parallel line |
| 78 | Tangent |
| 79 | Groove |
| 80 | Holding ring |
| 81 | Groove |
| 82 | Sealing ring |
| a | Distance |
| A | Intersection point |
| B | Intersection point |
| C | Intersection point |
| A1 | Side surface |
| A2 | Side surface |
| A3 | Side surface |
| A4 | Side surface |
| DN | Nominal diameter |
| E | Ellipse |
| G1 | Straight line |
| KA | Taper axis |
| K1 | Generatrix |
| K2 | Generatrix |
| LR | Line |
| PL | Point |
| rK | Radius of the flap disc |
| S0 | Intersection point |
| S1 | Construction point |
| T1 | Tangent |
| α | Angle |

What is claimed is:

1. Shut-off flap (10) for pressure spaces, with a flap disc (11, 32) which is pivotable relative to an axis of rotation (13, 46) in a housing (12, 37) and which, in the sealing position, closes the throughflow through the housing (12, 37) in two mutually opposite flow directions in the region of a seal, the flap disc (32) being arranged eccentrically, that is to say with an axis of rotation (46) outside a seal center line (39), and the axis of rotation passing, through a major axis of the shut-off flap, characterized in that the seal has a peripheral sealing surface DF with the following position:
   a. the sealing surface DF is part of a taper envelope, the generatrices (K1, K2) of which define the angles of the sealing surface DF in relation to the major axis (17, 38) of the shut-off flap,
   b. the generatrices intersect one another in the region of a taper apex (S1), the position of which can be determined as follows:
      b1. the seal center line (39) intersects the major axis (38) perpendicularly to the latter,
      b2. the axis of rotation (center of rotation 46) is arranged at a distance from the seal center line (39), on the major axis (38), and runs transversely to the seal center line and to the major axis,
      b3. with the axis of rotation (center of rotation 46) as the center point, a sealing circle (55) is defined, the diameter of which is smaller than the nominal width DN of the pipeline or of the available inside diameter within the shut-off flap (31),
      b4. intersection points of the sealing circle (55) with the seal center line (39) are designated as A and C, and the intersection point of the sealing circle (55) with a straight line through A and the center of rotation (46) is designated as B, B being located opposite the point A across the center point,
      b5. an intersection point of a tangent (T1) to the sealing circle (55) at the point A with a straight line B–C is designated as S0,
      b6. the segment A–B is displaced along the tangent (T1) until A lies on S0; the displaced B then indicates the taper apex S1, or the segment A–S0 is displaced along the segment A–B until A lies on B; the displaced S0 then indicates the taper apex S1.

2. Shut-off flap according to claiming characterized in that the flap disc (11, 32) is self-closing in both flow directions, and in that, for this purpose, in the closing position, the flap disc (11, 32) has, in the two flow directions, surfaces of different sizes laterally next to the axis of rotation (13, 46), both the larger surfaces and the smaller surfaces in each case being located diagonally opposite one another across the axis of rotation (13, 46).

3. Shut-off flap according to claim 1, characterized in that the flap disc (11, 32) pivots about an axis of rotation (13, 46) which passes through a major axis (17, 38) of the shut-off flap.

4. Shut-off flap according to claim 1, characterized in that the seal has a peripheral sealing surface (15, 16, 42, 43)—on the flap disc (11, 32) and/or on the housing (12, 37)—which is part of a taper envelope.

5. Shut-off flap according to claim 1, characterized in that the taper envelope has a taper apex (S1) which lies outside a major axis (17, 38) of the shut-off flap at a distance from said major axis which is greater than the radius rK of the flap disc (11, 32).

6. Shut-off flap according to claim 5, characterized in that the taper apex (S1) is at a distance a from the major axis (17, 38) of a=3rK, a being directed at least transversely to the axis of rotation (13, 46) and transversely to the major axis (17, 38) of the shut-off flap.

7. Shut-off flap according to claim 1, characterized in that the axis of rotation (13, 46) of the flap disc (11, 32) does not lie exactly on the major axis (17, 38), but is displaced at a distance transversely to the major axis, the distance being smaller than or equal to half the maximum depth TD of the sealing surface (15, 16, 42, 43) transversely to the major axis (17, 38).

8. Shut-off flap according to claim 1, characterized in that the taper apex does not lie at the point S1, but more closely to the major axis 38 and at the same time more closely to the seal center line 39.

9. Shut-off flap according to claim 1, characterized in that the taper apex does not lie at the point S1, but between the generatrices K1 and K2 belonging to S1.

10. Method for the production of a shut-off flap (10, 31) according to claim 1, characterized in that, for machining the seal geometry in the housing (12, 37), the latter is fixed on a turntable (61) with an orientation such that the axis of rotation (DA) of the table is at the same time the taper axis (KA) of the sealing surface, a rotating tool (62) removing the material of the housing (37) in the region of the sealing surface by means of a machining line (64) along a taper generatrix, and the table (61) being rotated.

11. Method according to claim 10, characterized in that the rotating tool (62) is moved along the taper generatrix (K1) in the direction of the taper apex and back again.

12. Method for the production of a shut-off flap according to one of claim 1, characterized in that, for machining the seal geometry of the flap disc (11, 32), the latter is fixed on a turntable (61), with an orientation such that the axis of rotation (DA) of the table is at the same time the taper axis (KA) of the sealing surface, a rotating tool (62) removing the material of the flap disc (32) or the material of the sealing elements provided on the flap disc by means of a machining line (64) along a taper generatrix, and the table being rotated.

13. Method according to claim 12, characterized in that the rotating tool (62) is moved along the taper generatrix (K1) in the direction of the taper apex and back again.

14. Method for production of a shut-off flap (10, 31) according to claim 1, characterized in that, for machining the seal geometry in the housing (12, 37), the latter is fixed on a turntable or indirectly by chucking jaws (70) of a rotating machine tool, with an orientation such that the axis of rotation (DA) of the table or of the machine tool is at the same time the taper axis (KA) of the sealing surface (42, 43), a cutting tool (68) with a cutting edge (69) removing the material of the housing (37) as a result of the rotation of the table or of the machine tool, and the cutting tool (68) being moved with the cutting edge (69) along a taper generatrix (K1).

15. Method for production of a shut-off flap according to claim 1, characterized in that, for machining the seal geometry of the flap disc (32), the latter is fixed on a turntable or indirectly by chucking jaws (70) of a machine tool, with an orientation such that the axis of rotation (DA) of the table or of the machine tool is at the same time the taper axis (KA) of the sealing surface (42, 43), a cutting tool (68) with a cutting edge (69) removing the material of the flap disc (32) or of sealing elements on the flap disc as a result of the rotation of the table or of the machine tool, and the cutting tool (68) being moved with the cutting edge (69) along a taper generatrix in the direction of the taper apex S0 or back.

* * * * *